United States Patent [19]

Tsuruoka et al.

[11] Patent Number: 5,327,252
[45] Date of Patent: Jul. 5, 1994

[54] PRINT EVALUATION APPARATUS

[75] Inventors: Shinsuke Tsuruoka, Kawasaki; Hiroshi Haruyama, Yokohama; Hideaki Uemura, Tokyo, all of Japan

[73] Assignee: Canon Kabushiki Kaisha, Tokyo, Japan

[21] Appl. No.: 764,364

[22] Filed: Sep. 23, 1991

[30] Foreign Application Priority Data

| Sep. 21, 1990 | [JP] | Japan | 2-252279 |
| Jun. 4, 1991 | [JP] | Japan | 3-132693 |
| Jun. 4, 1991 | [JP] | Japan | 3-132694 |
| Jun. 4, 1991 | [JP] | Japan | 3-132695 |
| Jun. 4, 1991 | [JP] | Japan | 3-132699 |
| Jun. 4, 1991 | [JP] | Japan | 3-132700 |
| Jun. 4, 1991 | [JP] | Japan | 3-132701 |
| Jun. 4, 1991 | [JP] | Japan | 3-132702 |

[51] Int. Cl.$^5$ .................................... H04N 1/00
[52] U.S. Cl. ...................... 358/406; 382/57
[58] Field of Search ............... 358/401, 406, 443, 462, 358/467, 488, 494, 498, 497; 382/16, 18, 19, 57

[56] References Cited

U.S. PATENT DOCUMENTS

| 4,831,458 | 5/1989 | Watanabe | 358/280 |
| 4,849,821 | 7/1989 | Allen et al. | 358/406 |

FOREIGN PATENT DOCUMENTS

| 0024521 | 3/1981 | European Pat. Off. | G06K 9/32 |
| 0149852 | 7/1985 | European Pat. Off. | G06F 15/70 |
| 0196851 | 10/1986 | European Pat. Off. | H04N 1/40 |
| 2586497 | 9/1987 | France | G11B 7/13 |
| 58-075961 | 5/1983 | Japan | H04N 1/04 |
| 59-158667 | 9/1984 | Japan | H04N 1/04 |
| 60-217186 | 10/1985 | Japan | B41J 21/00 |
| 60-247370A | 12/1985 | Japan | 358/406 |
| 1069159 | 3/1989 | Japan | H04N 1/04 |
| WO8804503 | 6/1988 | PCT Int'l Appl. | H04N 1/40 |
| 2069292 | 8/1981 | United Kingdom | H04N 1/00 A |
| 2072104 | 9/1981 | United Kingdom | B41B 19/00 |

OTHER PUBLICATIONS

IBM Technical Disclosure Bulletin, vol. 31, No. 4, Sep. 1988.

Primary Examiner—Edward L. Coles, Sr.
Assistant Examiner—Jerome Grant, II
Attorney, Agent, or Firm—Fitzpatrick, Cella, Harper & Scinto

[57] ABSTRACT

A print evaluating apparatus includes an image reader having a plurality of photoreceptors to read a print pattern line by line; a relative movement causing device for imparting relative movement between the print pattern and the image reader in a direction different from a direction in which the photoreceptors are arranged; and a processor for effecting plural operations in parallel for plural evaluation items for image signals corresponding to the print pattern supplied by the image reader during the relative movement, and for effecting evaluation on data provided by the operations.

76 Claims, 35 Drawing Sheets

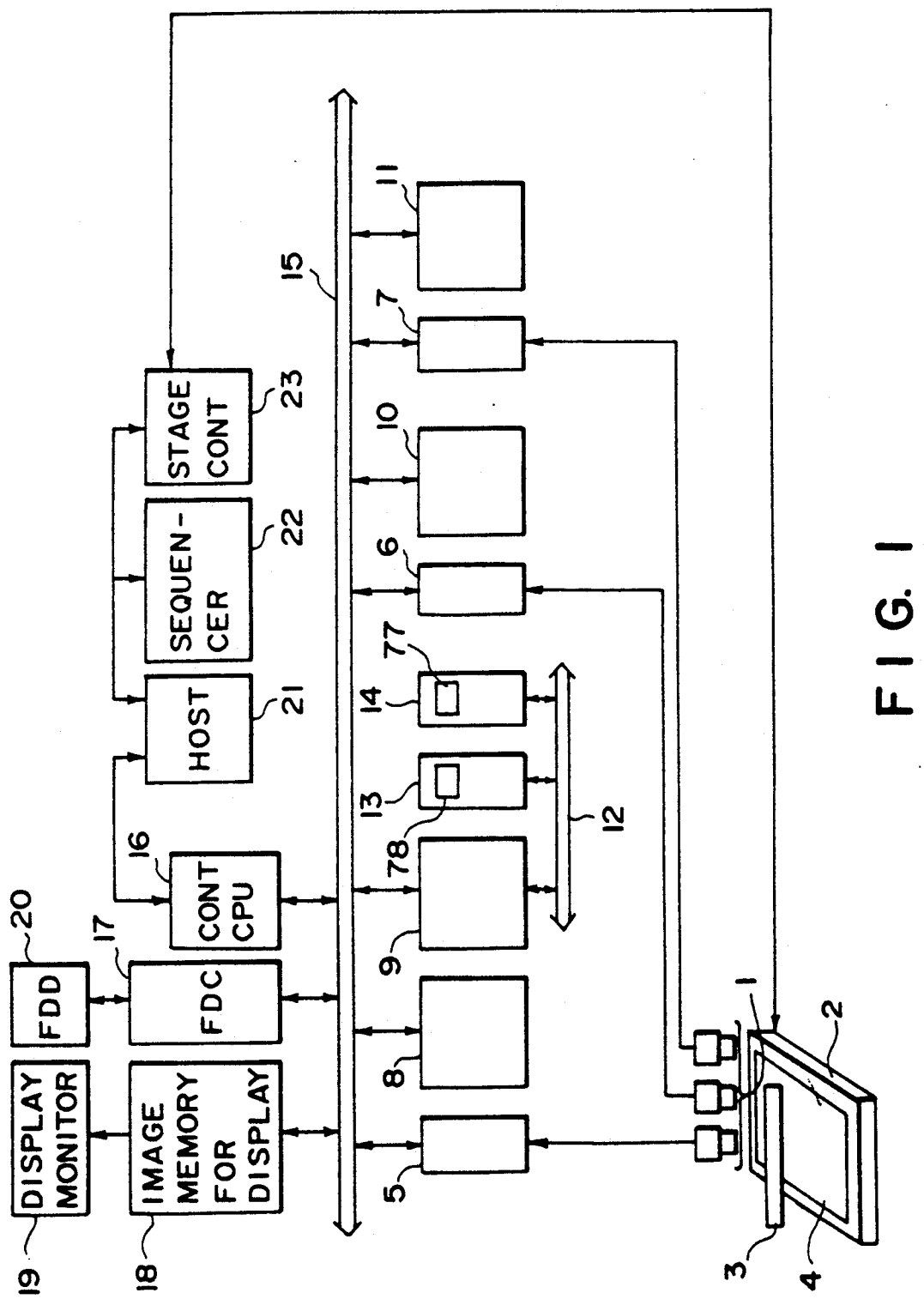
F I G. 1

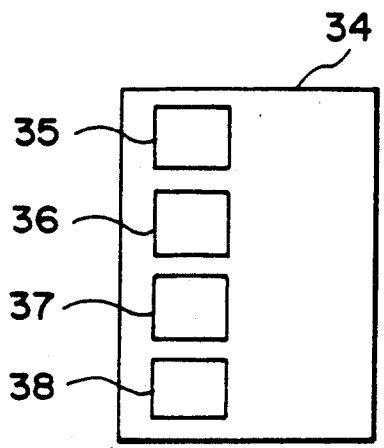
F I G. 4A
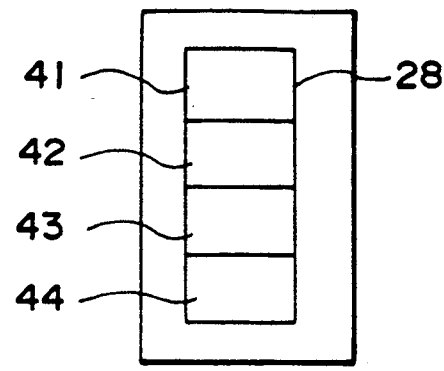
F I G. 4B
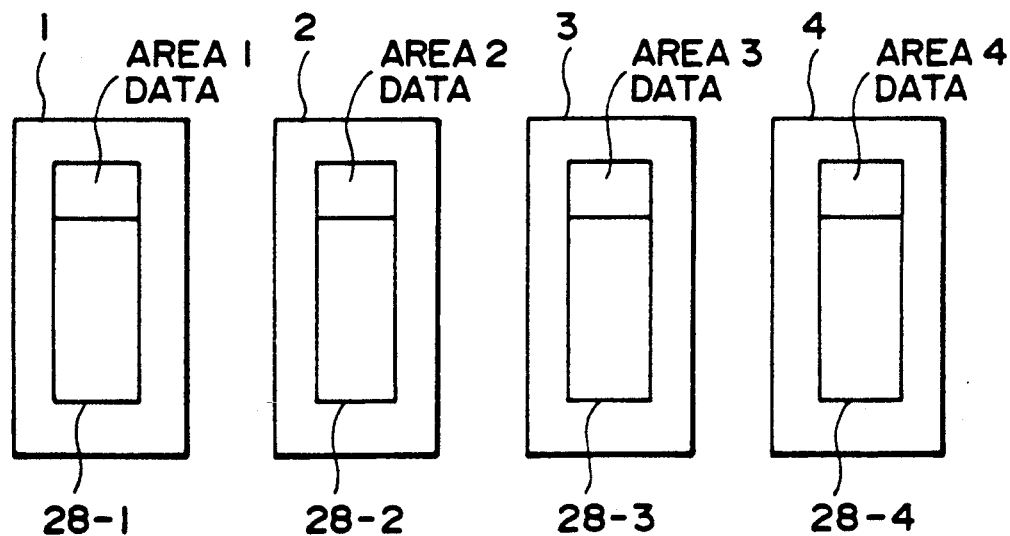
F I G. 4C

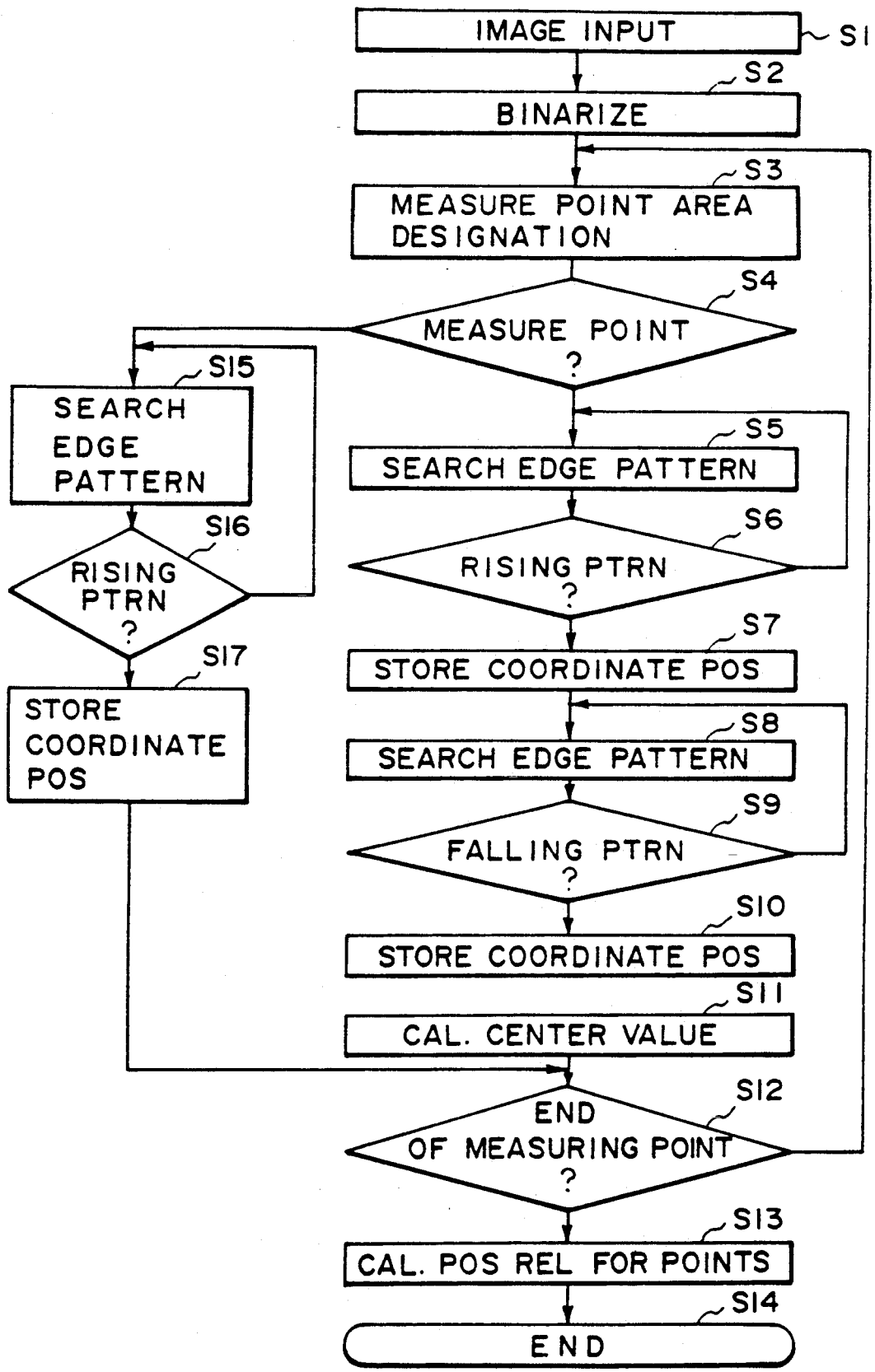
F I G. 7

| SNSR SCAN NO. (SH) 901 | ENCODER (μm) 902 |
|---|---|
| ⁓ | ⁓ |
| N+1 | 100050 |
| N+2 | 100100 |
| ⁓ | ⁓ |
F I G. 30A
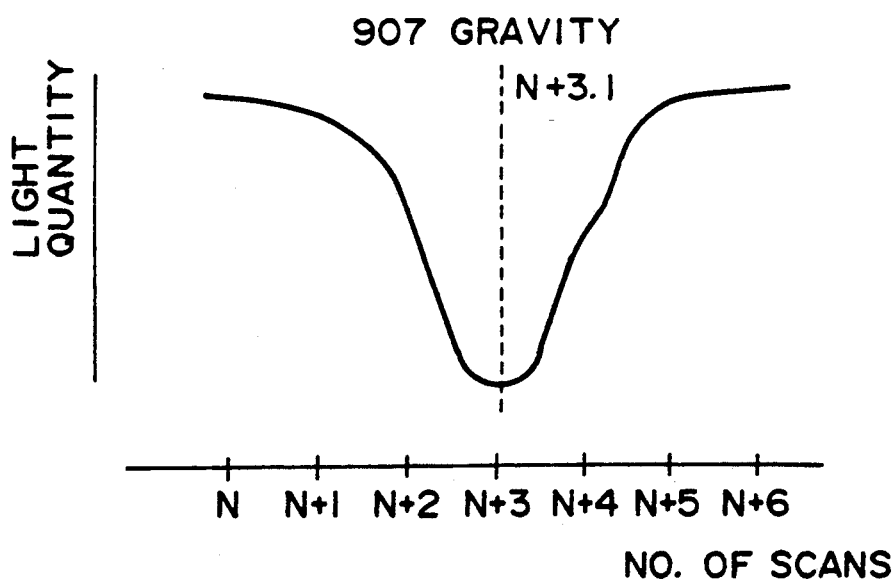
F I G. 30B

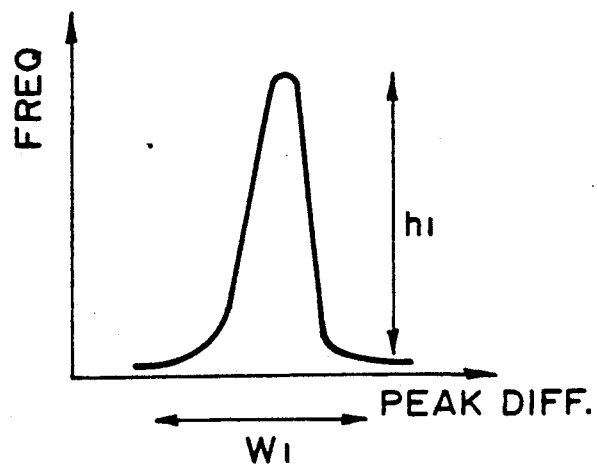
F I G. 34A
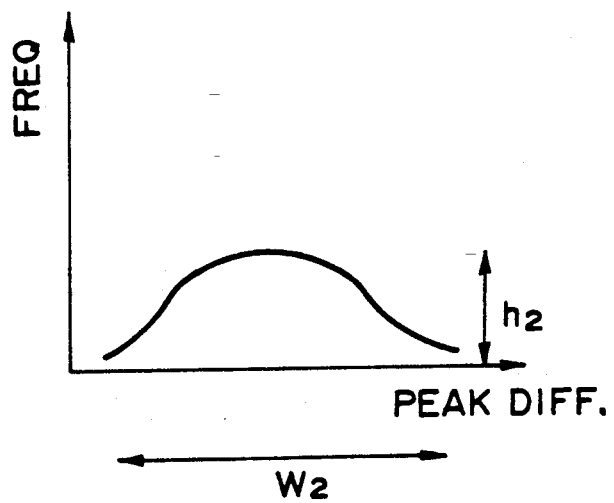
F I G. 34B

PRINT EVALUATION APPARATUS

FIELD OF THE INVENTION AND RELATED ART

The present invention relates to a print evaluation apparatus for evaluating or examining qualities of output images from an image outputting device on a recording material such as paper.

Conventionally, the evaluation of the print output of an image outputting device (such as an ink jet printer, a laser beam printer or the like) has been carried out on the basis of visual examination or inspection. In a sampling inspection in a production line or in a performance evaluation during development of the printers, the print has been evaluated on the bases of image processing using an area sensor such as an ITV.

However, in visual inspection, the results of the evaluation are different depending on individuals, and in addition, the evaluations are subjective. In addition, it be required that the output image is precisely overlaid on a reference chart, and the visual inspection is carried out. This puts much pressure on the inspector.

In the evaluation method using the area sensor such as an ITV, the inspecting area is only 25 mm×25 mm when an ITV of 512×512 bits are used. In order to cover the whole surface of an A4 size sheet (210 mm×297 mm), for example, several of image reading and processing operations have to be repeated, and therefore, a long time is required.

SUMMARY OF THE INVENTION

Accordingly, it is a principal object of the present invention to provide print evaluation apparatus capable of evaluating the qualities of a print with precision and at high speed.

It is another object of the present invention to provide a print evaluation apparatus suitably usable for print evaluation during manufacturing of printers.

It is a further object of the present invention to provide a print evaluation apparatus in which a predetermined printer pattern is read by reading means, and plural processing operations for plural evaluation items for the image data corresponding to the print pattern, are carried out parallel in time.

It is a further object of the present invention to provide a print evaluation apparatus wherein a predetermined pattern is read during relative motion between the pattern and the reading means, movement data during the relative movement are stored in association with the reading timing, and the print evaluation can be carried out in accordance with the movement data and the image signal without influence of non-uniformity of the movement with precision and at high speed.

It is a further object of the present invention to provide an automatic print evaluation apparatus wherein plural printed patterns on a print are read, and the evaluation for a plurality of evaluation items are carried out on the basis of the image signals corresponding to the read pattern.

It is a further object of the present invention to provide a print evaluation apparatus wherein a line pattern is read, and the linearity of the line pattern is evaluated on the basis of information relating to an end position obtained from a read image and information relating to a width thereof.

It is a further object of the present invention to provide a print evaluation apparatus wherein a printed pattern on a print is read line-by-line, and an end position and a pattern position on the print is determined on the basis of the read image, and thereafter, the printing position accuracy is evaluated on the basis of the relative positional relation.

It is a further object of the present invention to provide a print evaluation apparatus wherein a line pattern printed at a constant pitch in the direction of the relative motion between the printing head and the print, and the pitch of the line pattern is determined on the basis of projective data in the direction of the length of the lines of the line pattern, on the basis of which the relative motion is evaluated.

It is a further object of the present invention to provide a print evaluation apparatus wherein first and second patterns on a print are read by plural readers having different measurement resolution power, and different evaluations are made on the basis of the read images.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a block diagram of a print evaluation apparatus according to a first embodiment of the present invention.

FIGS. 4(a-c) illustrate an image memory storing plural area data.

FIG. 7 is a flow chart illustrating print position accuracy evaluation.

FIGS. 30(A,B) illustrate correction of speed non-uniformity of the stage.

FIGS. 34(A,B) show peak difference frequency distribution.

DETAILED DESCRIPTION OF THE PREFERRED EMBODIMENTS

Figure 2:
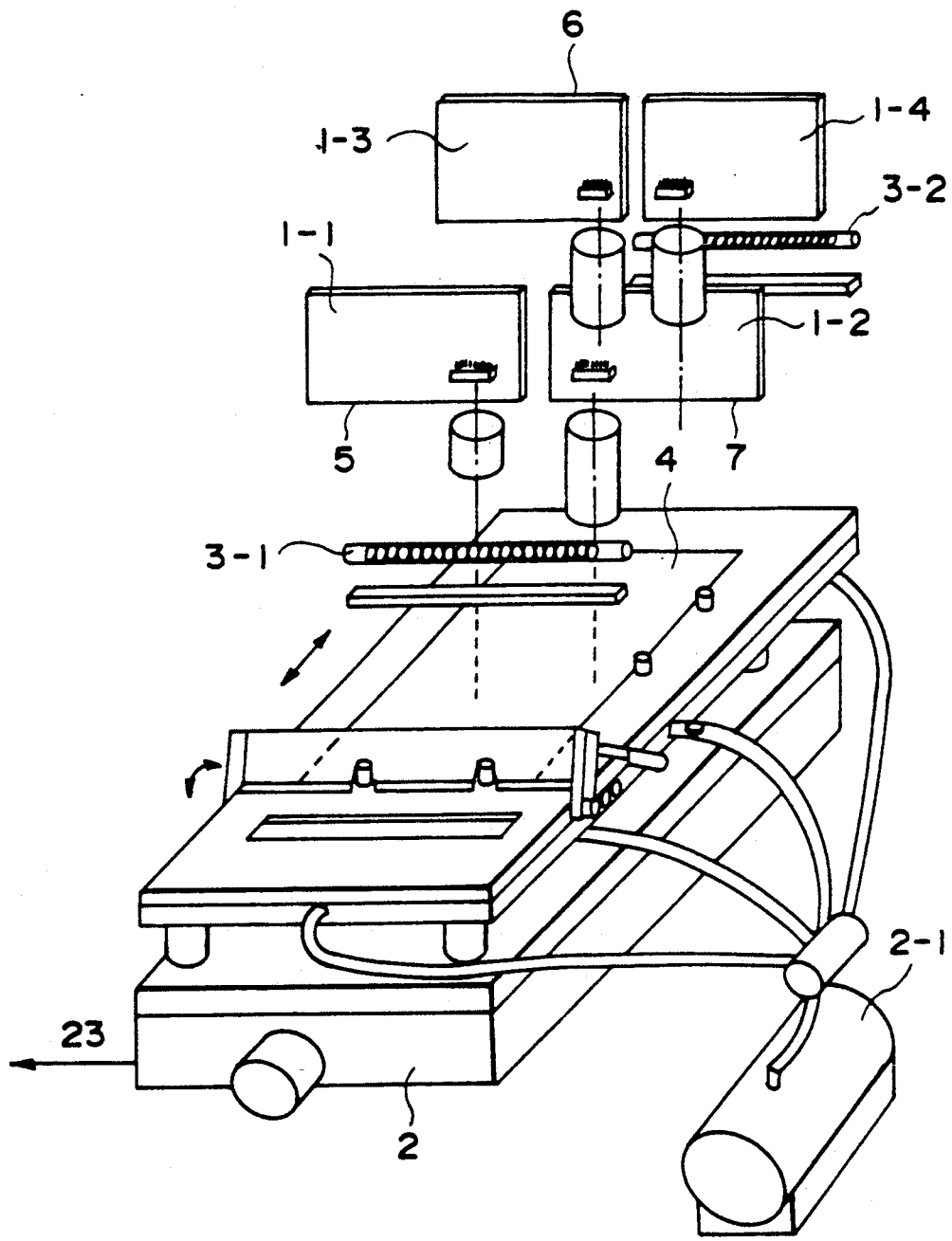
FIG. 2 shows a perspective view of an outer appearance of a part of the print evaluation apparatus.

The embodiments of the present invention will be described in detail in conjunction with the accompanying drawings.

Referring to FIG. 1, there is shown a block diagram of a print evaluation apparatus according to an embodiment of the present invention. It comprises an image pick-up device 1 including a photoreceptor in the form of one dimensional CCD line sensor or the like. It picks up an image of the paper 4 to be inspected, and it converts the read data to electric signals scan by scan. An illumination system 3 illuminates an image pick-up position by the image pick-up element 1, and a stage 2 is movable in a direction perpendicular to a direction in which the photoreceptors of the image pick-up device 1 are arranged. By the image pick-up device 1 and the stage 2, the image to be evaluated can be read as a two dimensional image. The image signal provided by the image pick-up device 1 is subjected to A/D conversion by A/D converters 5-7, and therefore, are converted to digital data. The data are subjected to a dark correction or shading correction operation, and thereafter are transferred to image processors 8-11. The image processors 8-11 can divide the image data into plural evaluation areas and stores them. In addition, plural image processors can be connected through bus 15 to a single A/D converter. In this case, the plural image processors are operable in parallel. As shown, a histogram operation part 13 and a run code operation part 14 may be connected to the image processor 9 through the bus 12 when it is connected with the histogram operation part and the run code operation part 14, the image data transmitted from the A/D converter 5 are stored in image memory in the image processor 9, and simultaneously, they are transmitted to the histogram operation part 13 and the run code operation part 14. The results of the operation are stored in the memory in the respective operation parts. The stored operation results may be read by the image processor 9 through the image bus 12. A control CPU 16 controls the A/D converters 5-7, the image processors 8-11, a floppy disk controller (FDC) 17 and image memory 18 for display in accordance with operational instructions from a host computer 21. In a floppy disk 20, parameters of this system are stored, which include, for example, the binary code level set in the A/D converters 5-7, data for the dark correction and the shading correction, the number of areas for reading the image by the image processors 8-11, ranges of the areas, threshold for the evaluation items, and image processing parameters such as window size or the like of a smoothing filter. The parameters are readable and rewritable by the command from the host computer 21. To the memory 18 for the display, the data of the image memory of the image processors 8-11 can be supplied through a bus 15, and the image data are displayed on a display monitor 19.

A stage controller 23 controls a stage 2 in accordance with the instructions from the host computer 21. A sequencer 22 controls positioning, mounting or other operations for the sheet 4 to be inspected.

FIG. 2 is an outer appearance perspective view of the image pick-up device 1, the stage 2 and the illumination system 3 or the like.

In the Figure, the image pick-up device 1 comprises four image pick-up portions 1-1-1-4 having CCD line sensor (photoreceptor) elements. The picked up image signals are supplied to the A/D converters 5-7. The image pick-up parts 1-1 and 1-2 constitute a pair, and the image pick-up devices 1-3 and 1-4 constitute another pair. The image pick-up parts 1-3 and 1-4 produce image signals to the A/D converter 6. The stage 2 further comprises a cylinder 2-1 for mounting the sheet 4 to be inspected on the surface of the stage 2. Similarly to the stage 2 itself, it is controlled by a stage controller 23.

The illumination system 3 comprises illuminators 3-1 and 3-2 having halogen lamps. They are provided for a pair of the image pick-up parts 1-1 and 1-2 and the image pick-up parts 1-3 and 1-4. From the standpoint of smaller quantity of heat produced, a fluorescent lamp is preferable if the quantity of light is sufficient.

Figure 3:
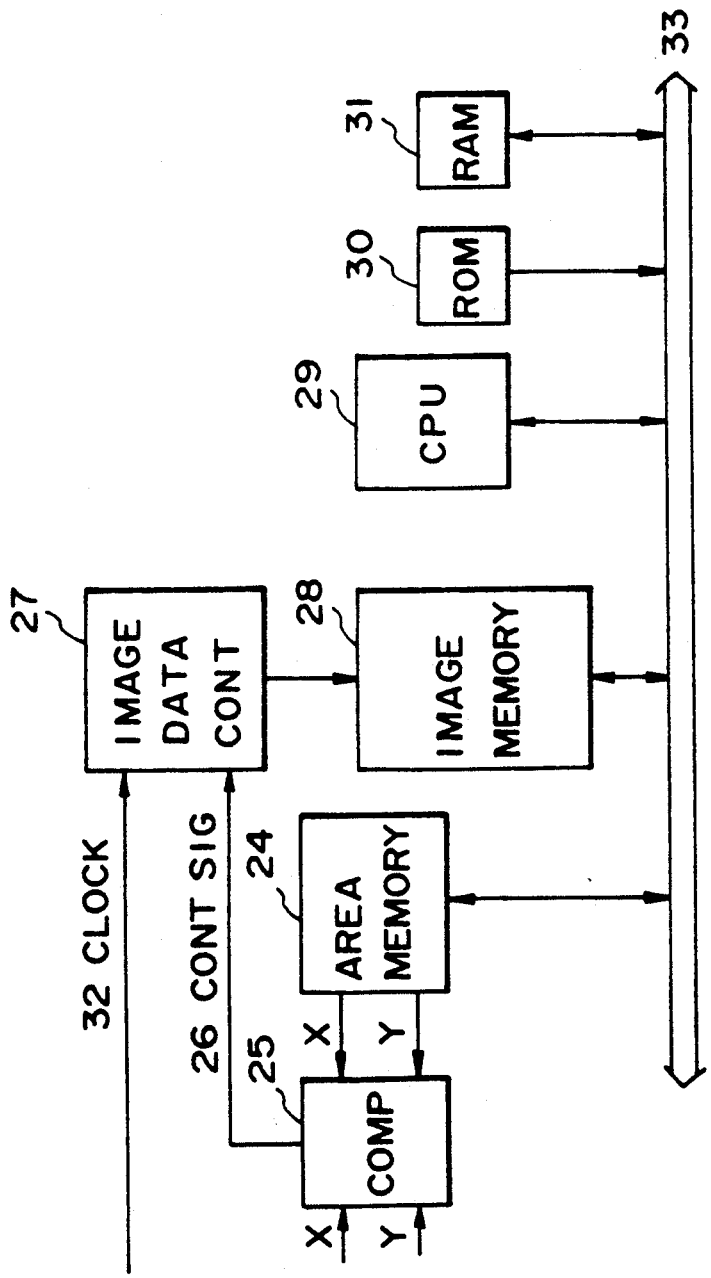
FIG. 3 is a block diagram of an image memory controller.

FIG. 3 is a block diagram of an image memory controller in the image processors 8-11. In the area memory circuit 24, a start position on the X direction on a coordinate at which image reading area starts, X position at which it ends, Y position at which it starts and a Y position at which it ends, are written. When plural areas are to be read, the area memory circuit 24 stores starting and ending X and Y positions for the respective areas.

The plural areas may be defined so as to be overlaid with each other. A comparator circuit 25 compares current X and Y positions of the image with the positions stored in the area memory circuit 24. If the current X and Y positions in the image fall within the X and Y positions stored in the memory circuit 24, a control signal 26 is transmitted to an image data control circuit 27, and the image data are written in the image memory 28. After all the data are stored in the image memory 28 for the set area, the CPU 29 read the data out and executes the image processing operation set in a ROM 30 and a RAM 31.

FIG. 4A shows plural areas 35-38 set for an object 34 to be inspected. FIG. 4B shows the image memory 28 of the one of the image processors storing the data of the area set in FIG. 3.

The data of the areas 35-38 are divided and stored in the image memory 28 of the image processor as area data 41-44. In this case, the starting and ending X and Y positions for the areas 1 (35)-4 (38) are written in the area memory circuit 24 of FIG. 2.

FIG. 4C illustrates the divided storing by plural image processor for the image data of the plural areas. The starting and ending X and Y positions (coordinate positions) for the area 1 (35) are stored only in the area memory circuit of the image processor 1. Only the area 1 data (53) are stored in the image memory 28-1. Similarly, the image processor 2 deals with the area 2 (36); the image processor 3 deals with the area 3 (37); and the image processor 4 deals with the area 4·(38). By doing so, the plural image processors are able to process the image data for the plural areas in parallel. By this allotment system, the data only for the necessary portion out of the very large image region, can be efficiently stored in the respective image memory means. Also, the parallel operations are possible, thus increasing the processing speed.

Figure 5:
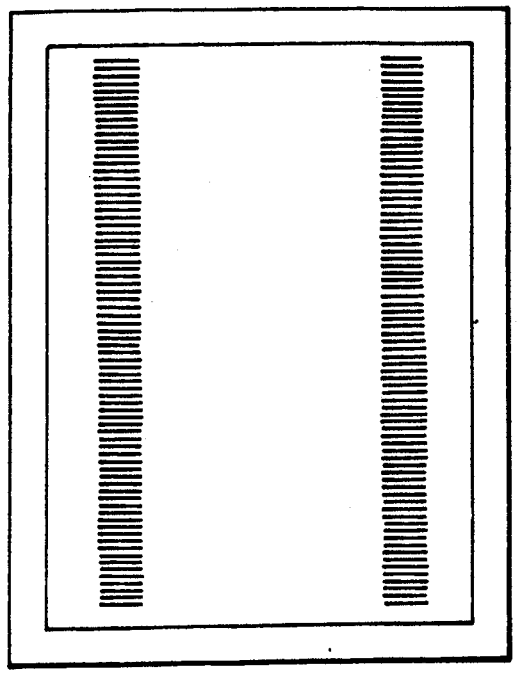
FIG. 5 illustrates an example of a pattern for evaluation.
Figure 6:
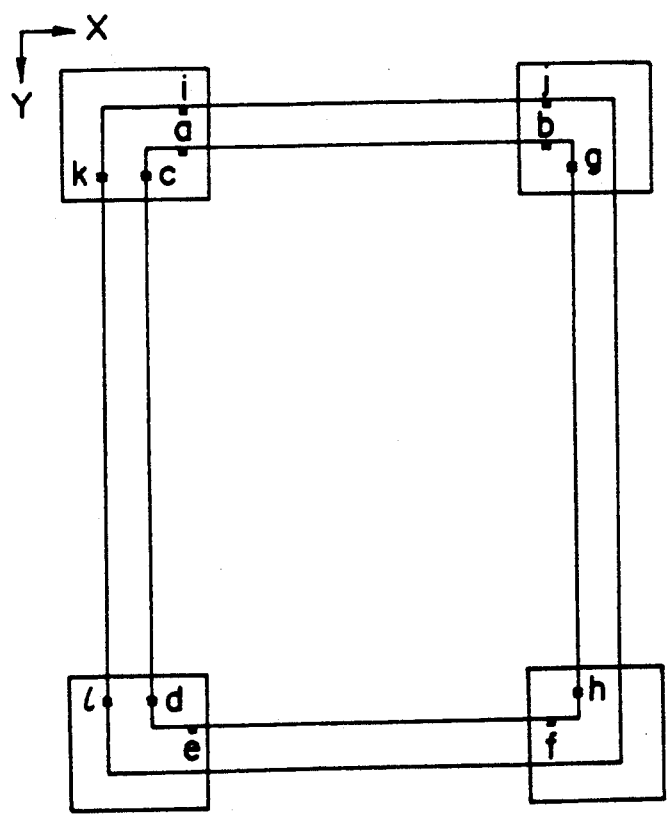
FIG. 6 shows inspection point areas of the evaluation pattern.
Figure 8:
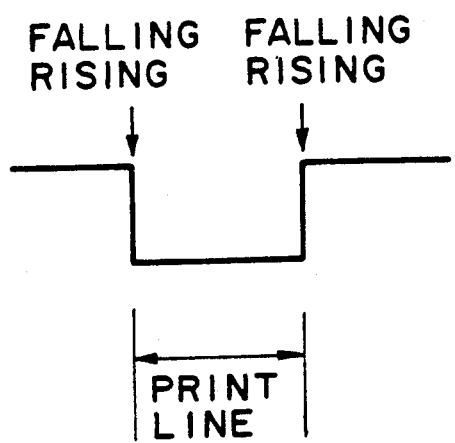
FIG. 8 illustrates binary signal output.

Referring to FIGS. 5-8, the printing position accuracy evaluation method will be described. FIG. 5 shows an example of an evaluation pattern produced by the machine to be evaluated. FIG. 6 shows an example of measuring point area for the pattern. FIG. 7 is a flow chart of the sequential operations in the print position accuracy evaluation method. FIG. 8 shows an example of a binarized signal. The pattern to be evaluated is read by the image processing device (S1), and the data are binary-coded (S2). Coordinate positions are calculated for sheet ends and printed lines set beforehand in the area memory circuit 24 as the points necessary for the evaluation of the print position accuracy (S3). In the inspecting point area set, the discrimination is made as to whether a sheet end inspection or print line inspection (S4). If it is for the print line position, a line edge pattern is searched from the binary data (S5), and the coordinate positions of the rising position and the falling position are stored, as shown in FIG. 8. From these data, a center of the printed line width is calculated, and the central position is stored as the position of the line. If the inspection point area is a sheet end, an edge pattern is searched, at the falling position is stored (S15-S17). FIG. 8 shows the relation between the binary signal output and the falling position and between the output and the rising position. After the coordinate positions are calculated for all of the inspecting points, the positional relations among the inspecting points are calculated, and the print position accuracy is evaluated. For example, the calculations are as follows:

$ay - iy$, and $dy - ji$

Perpendicularity = $|(ay-by)/(ax-bx)+(cx-dx)/(cy-dy)| \times 100(\%)$

Inclination = $|(ay-iy)-(by-jy)/(ax-bx)| \times 100(\%)$

Parallelism = $|(ay-ey)-(by-fy)/(ax-bx)| \times 100(\%)$ where a−f, i and j represent the respective inspection points; x and y are x and y coordinate positions for the inspecting points. The results are compared with reference values. The frame lines for the pattern to be evaluated are not limited to the frame lines defining the area in which the image formation is possible. The frame lines may be horizontal lines at a position 5 mm away from the sheet top and a vertical line at a position 4 mm away from the left end thereof.

Figure 9:
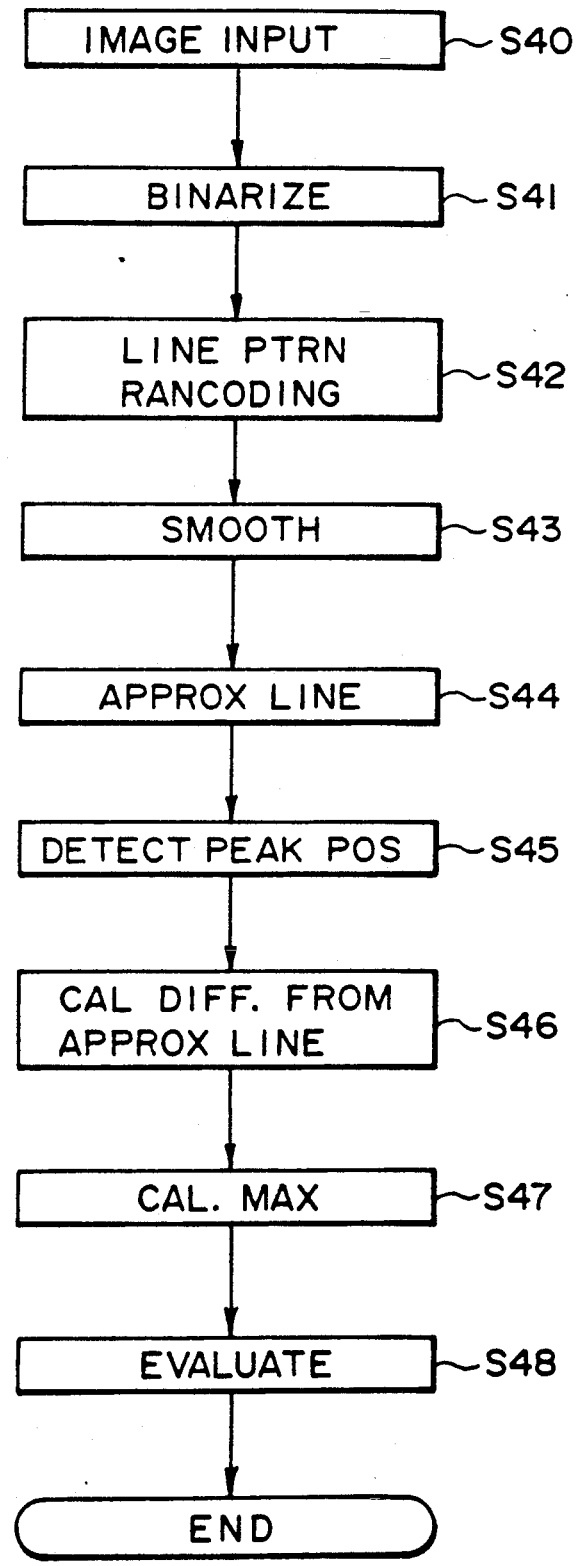
FIG. 9 is a flow chart illustrating a print linearity evaluation method.

FIG. 9 illustrates the method of evaluation in the linearity for a printed line. The evaluation is carried out by the image processor 9.

The image (line pattern) supplied at a step S40 is converted to binary data (S41). The line pattern is stored in the run code memory 77 of the run code operation part 14 as an edge position data and a line width data (S42). At this time, by designating a limit of the line width, the noise which is larger than the width limit or smaller than that, can be removed, and therefore, only the data for the line pattern are stored. In order to remove the fine roughness of the edges, a smoothing operation is carried out in each of the blocks (S43). In this operation, the coordinate positions for the edges detected at step S42 are used. Using the smoothed edge positions, an approximation to a rectilinear line is carried out (S44), and the line is taken as a reference line in the linearity evaluation. A peak position is detected from the smoothed edge positions (S45).

The peak position is a top or a bottom of a wave of the edge. As for the peak detecting method, the difference between adjacent edge positions is obtained, and the sign of the difference (positive or negative) is inspected. The peak position is defined as a point where the sign changes from the positive to the negative or from the negative to the positive. When the difference is zero, a center of the zero range is taken as the peak position. Then, the difference between the peak position and a reference line is calculated (S46), and the maximum of such differences is determined (S47), then, the discrimination is made as to whether or not the maximum obtained at step S47 is tolerable or not. This is the end of the evaluation (S48).

Figure 12:
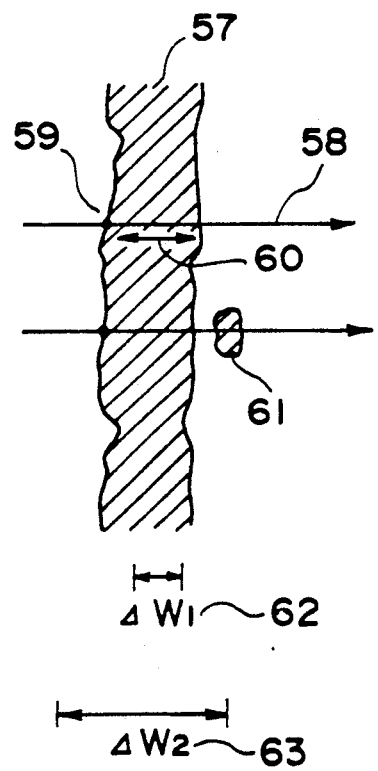
FIG. 12 illustrates run code data.

FIG. 12 illustrates the run code data used in the linearity evaluation.

Designated by a reference numeral 57 is a line pattern, 58 is a scanning position for obtaining the run code data. The starting points and the widths of the binary image are sequentially stored in the run code memory. Designated by 59 is a starting coordinate position of the pattern stored in the run code memory 77, 60 is a pattern width stored in the run code memory 77. At a point of time when the image is inputted and converted to binary data, they are stored in the run code memory 77 as the run code data, and therefore, the data can be stored more efficiently than when the two dimensional image is stored as it is in the memory. When the image is read as the run code data, a maximum width limit 63 and the minimum width limit 62 for the pattern are selected, by which the noise pattern 61 or the like is not sampled, and only the data for the line pattern are read.

Figure 10:
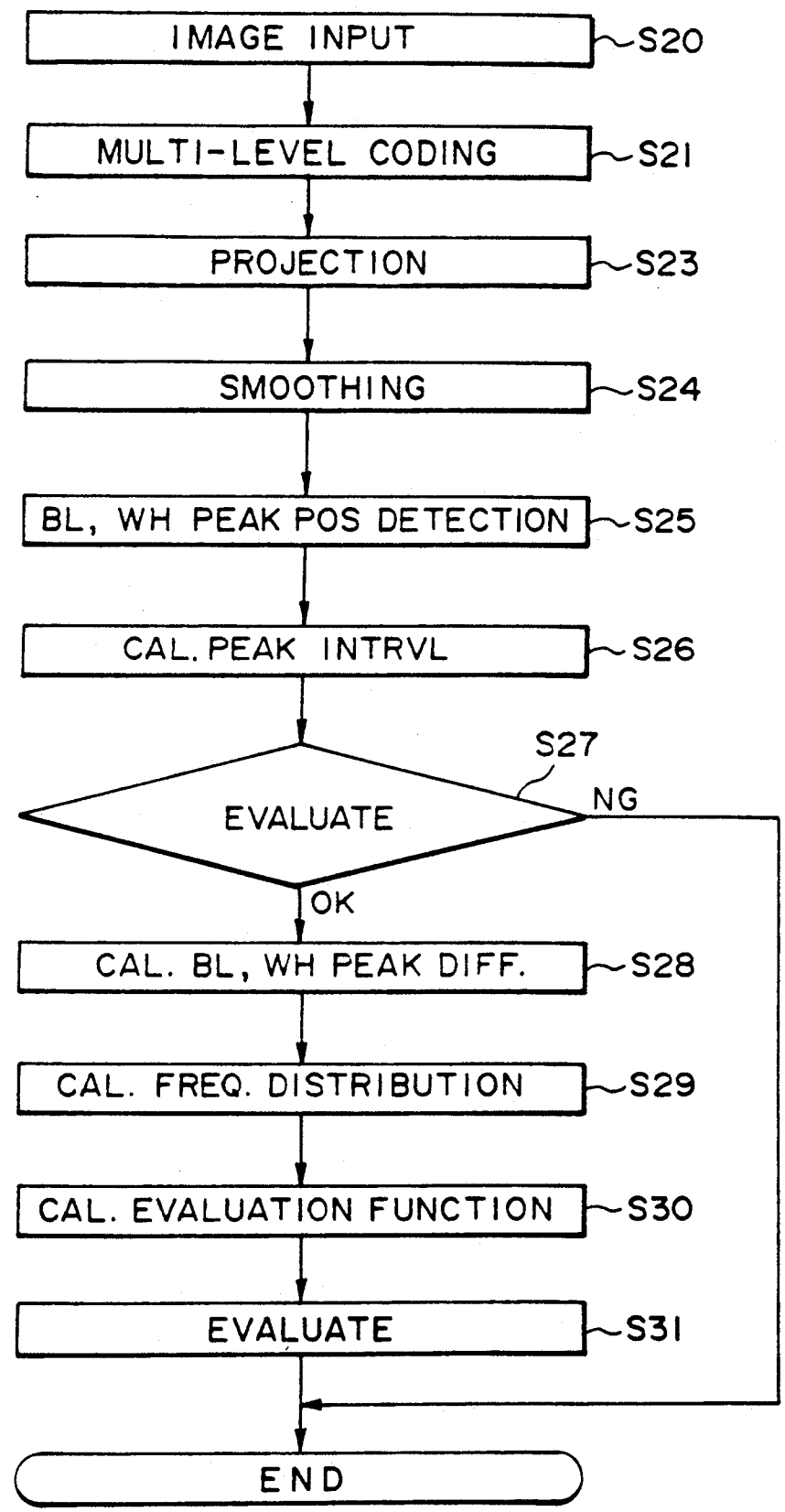
FIG. 10 is a flow chart for a pitch non-uniformity evaluation method.

Referring to FIG. 10, the evaluation for the non-uniformity of the printing pitch will be described.

The image data read at step S20 are incorporated as multi-level data indicative of multi-density level (S21), and are subjected to projection operation by the histogram operation part 13, and are stored in the memory 78 (S22). Here, projection means addition of multi-level data in the direction of the length of a line pattern printed. One dimensional data obtained at step S23 are smoothed, so that noise components are removed (S24). Peak positions of the smoothed projective data are detected (S25). Here, the peak positions are the top or bottom of the wave of the projective data. As for the peak detection method, the difference between the adjacent projective data is calculated, and the sign (positive or negative) is inspected. The peak position is defined as a point where the sign changes from the positive to the negative, or from the negative to the positive. When the difference is zero, the center of the zero range is defined as the peak position. As another peak detecting method, the center of gravity of the convex or concave portions of the wave, and the gravity position may be defined as the peak position.

Subsequently, the interval between the adjacent peaks obtained by the step S25 is calculated, and it is defined as a pitch (S26). Then, the pitch is evaluated (S27). As for the method of evaluation, the maximum and minimum of the pitches are taken. As another method a variance of the pitch data is determined, and the evaluation may be made on the basis of the variance. When the pitches change periodically, for example, when the pitches change alternately for even number and odd number, the difference is determined between an average of the even number pitches and the average of the odd number pitches, and the evaluation may be made on the basis of whether the difference is beyond a reference level. If the negative evaluation is the result at step S27, the evaluation operation ends there. If the result of the evaluation is positive, the next evaluation is carried out. Even if the pitches are good, the density non-uniformity appears in the entirety of the image if the contrast between the printed line and the background varies. In order to check this point, the peak difference between the white and black portions, that is, the height difference between the adjacent bottom and top, is determined (S28).

Then, the frequency distribution of the peak difference obtained at step S28 is calculated (S29). When the contrast is constant, a high frequency distribution appears at a certain peak difference, and the frequency distribution does not vary very much. On the contrary, if the contrast is not uniform, the height of the frequency distribution is low, and variance is high. Therefore, a evaluation function h/w is used, where h is the height of the frequency distribution, and w is the bottom width thereof. It is taken as a state value of the contrast (S30). On the basis of the evaluation function obtained at step S30, the evaluation is made (S31).

Figure 11A:
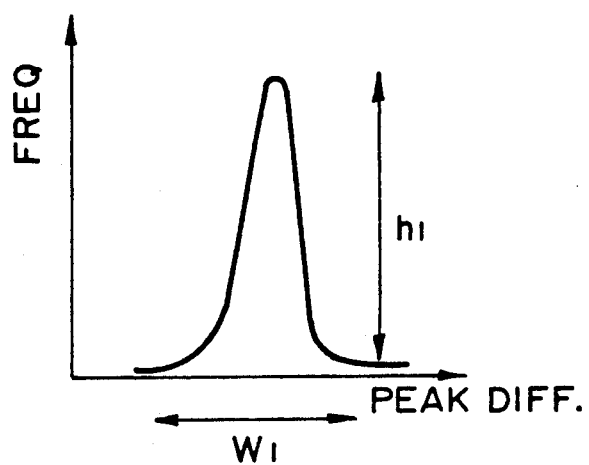
FIGS. 11(A,B) which are graphs of peak difference frequency distribution.
Figure 11B:
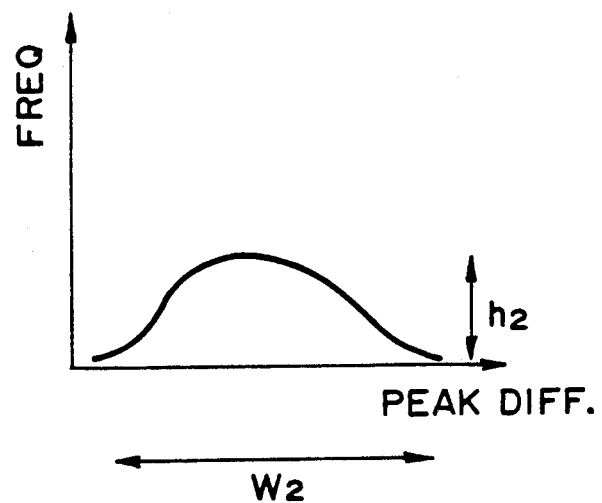

FIG. 11A shows the peak difference frequency distribution when the contrast is constant, and FIG. 11B shows the peak difference frequency distribution when the contrast is not uniform. In these Figures, h1 and h2 are maximums of the respective frequency distribution, and w1 and w2 are bottom widths of the frequency distributions.

Figure 13:
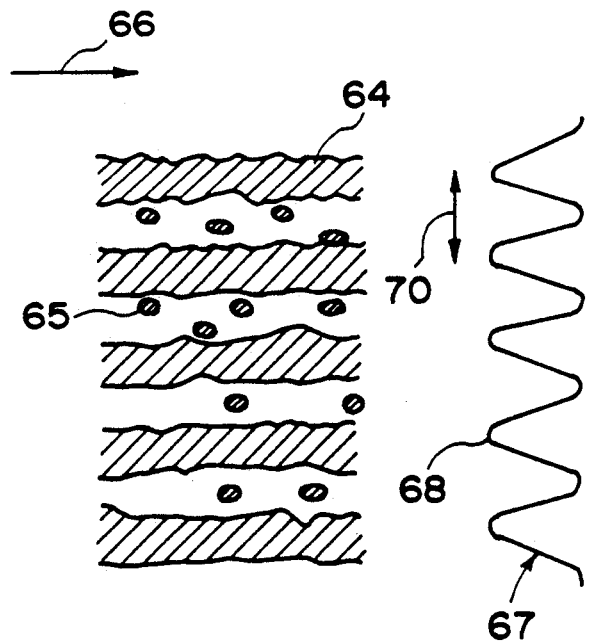
FIG. 13 illustrates projection of a line pattern.

FIG. 13 illustrates projective data of line pattern. Designated by a reference numeral 64 is a printed line pattern, and 65 is a noise component existing between lines. The direction of the length of the line is indicated by a reference numeral 66. The projective datum 67 is a sum of the multi-level data in this direction. In the projective data, the portion of the line appears as a top peak 68, and the background between adjacent lines appear as a bottom. By using the projective data, the noise between adjacent lines and the roughness of the edges of the line can be removed, and therefore, the pitch between lines can be correctly extracted.

Figure 14:
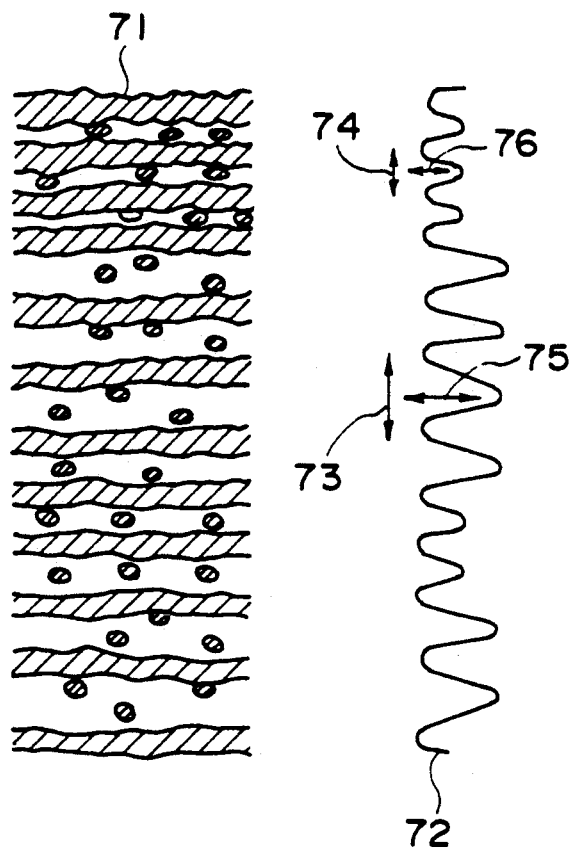
FIG. 14 illustrates pitch non-uniformity.

FIG. 14 illustrates non-uniformity of the pitches when a line pattern is printed. In this Figure, reference numeral 71 designates a printed line pattern; 72 is projective data; 73 is correct pitch; and 74 designates incorrect pitch which is smaller than the normal pitch. The peak difference 76 in the incorrect position is smaller than the peak difference 75 between the adjacent top and bottom peaks in the correct portion.

Second Embodiment

Figure 15:
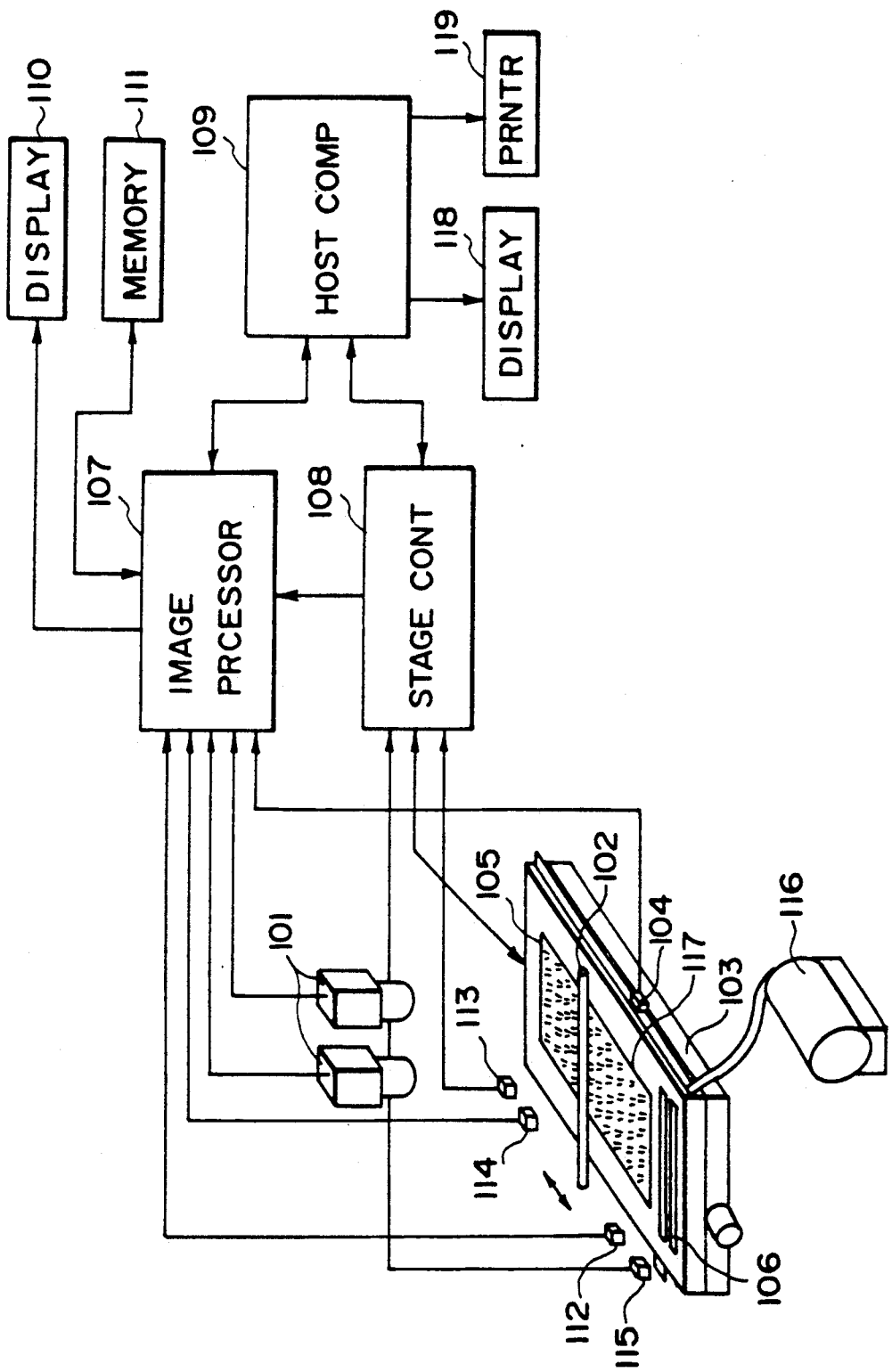
FIG. 15 illustrates a print evaluation apparatus according to a second embodiment of the present invention.

A description will be made as to an embodiment wherein the parallel processing is carried out for plural evaluation items using a combined pattern. FIG. 15 shows a print evaluation apparatus according to a second embodiment of the present invention. An image pick-up device 101 comprises four photoreceptors in the form of one dimensional CCD line sensors or the like. They pick-up images from a sheet 105 to be detected, and the images are converted to electric signals. An illumination system 102 illuminates the image pick-up line of the image pick-up device 101. A stage 103 is movable in a direction perpendicular to a direction in which the photoreceptors of the image pick-up device 101 are arranged. The image on the sheet 105 to be inspected is read as a two dimensional image by the image pick-up device 101 and the stage 103. A stage controller 108 drives the stage 103 in accordance with the instructions of the host computer 109. To the stage 103, a linear encoder 104 and stage sensors 112–115 are mounted. An output of the linear encoder 104 is used for correcting the speed non-uniformity of the stage 103. The output of the stage sensor 112–115 is used as a trigger signal for driving the stage and reading the image. On the stage 103, there is a correcting chart 104 which is used to correct the sensitivity of the image pick-up device 101 and the shading correction.

The image signal from the image pick-up device 101 is supplied to an image processor 107, and is subjected to image processing for each of the evaluation items. The results are supplied to a host computer 109. The image processor 107 is capable of receiving information from plural image pick-up devices. A display monitor 110 is capable of displaying image data supplied to the image processor 107. An external memory means 111 stores the program for controlling the image processor 107 and parameters for the image processing operation. The data or program therein is accessed by the host computer 109, and they may be rewritten. A monitor 118 displays the results of the evaluation supplied from the host computer, and a printer 119 prints the results. In the sheet setting region of the stage 103, a plurality of sucking holes 117 are formed and distributed in accordance with the size of the sheet to be inspected. After the sheet is set, the sheet is fixed on the stage by a vacuum device 116.

Figure 16:
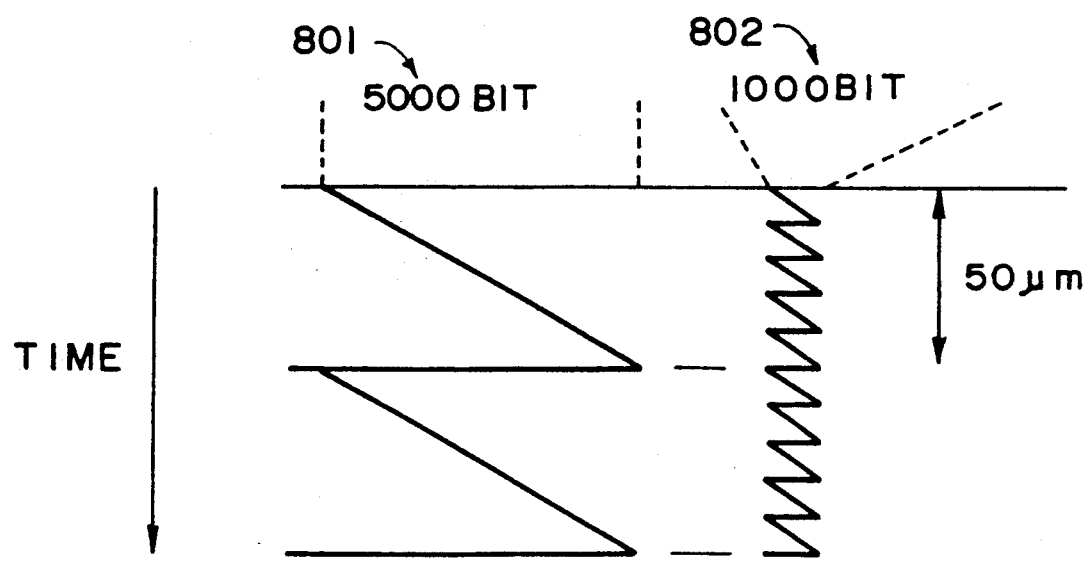
FIG. 16 shows a line sensor used in the print evaluation apparatus of FIG. 15.

In the evaluation apparatus of this embodiment, plural sensors having different detecting resolution powers read the image simultaneously and at the same speed in one scan, and on the basis of the data obtained in the scan, the evaluations are possible. In FIG. 16, 5000 bit line sensor 801 scans the entire A4 sheet surface with the performance of 1/7 magnification, and a width of 50 microns. A 1000 bit line sensor 802 scans a pitch sensing area 509 shown in FIG. 22D which will be described hereinafter, with the performance of 1/3.57 magnification, the sensing width of 10 mm and the resolution of 10 microns. Both of the sensors are driven at the frequency of 8 MHz. Then, by one stage movement, the sensing operations with the resolution of 50 microns and 10 microns are simultaneously carried out. In order to cover the lateral width of an A4 sheet with the resolution of 50 microns, 500 bits are required, and in order to provide the resolution of 50 microns also in the stage moving direction (perpendicular to the sensor scan), the stage moving speed S at the sensor driving frequency of 8 MHz is:

$$S = 50 \text{ microns} \times 8 \text{ MHz}/5000 \text{ bits} = 80 \text{ mm/sec}$$

Therefore, one scan takes 3.75 sec for a longitudinal length of A4 sheet. In order to provide the resolution of 10 microns at the same stage speed, $$\begin{aligned}\text{sensor bits} &= 10 \text{ microns} \times 8 \text{ MHz}/(80 \text{ mm/sec}) \\ &= 1000 \text{ bits} \\ &\text{(inspection area: 10 mm)}.\end{aligned}$$

As shown in FIG. 16, during stage movement through 50 microns, one scan and 5 scans are required by 5000 bit and 1000 bit sensors, respectively.

In this embodiment, line sensors 205 and 206 (FIG. 18) which will be described hereinafter are 5000 bit sensors, and line sensors 207 and 208 (FIG. 18) are 1000 bit sensors.

Figure 17:
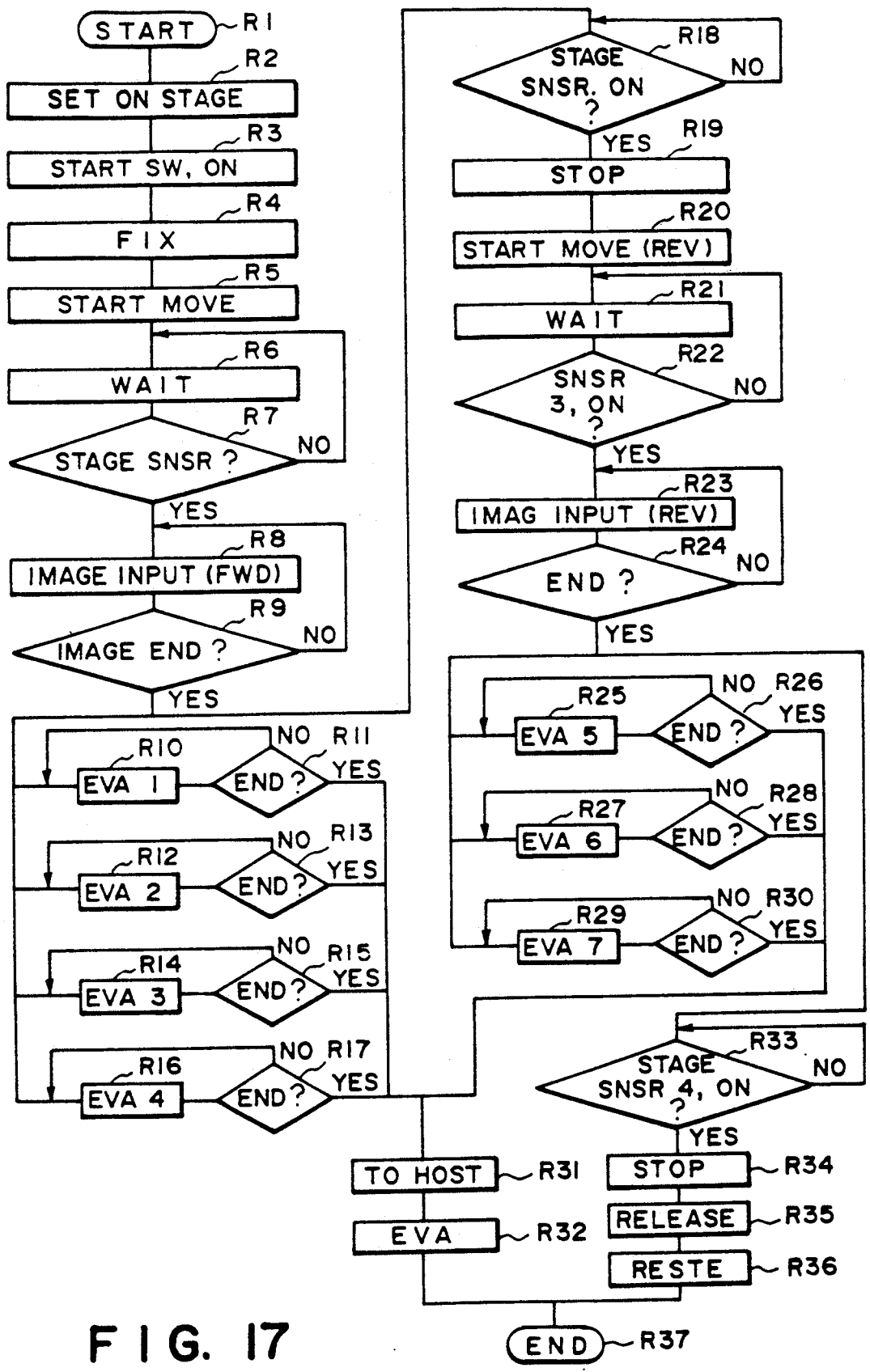
FIG. 17 is a flow chart of a print evaluation method in the second embodiment.

Referring to FIG. 17, the control for the operation carried out by the image processor 107 and the stage controller 108, will be described. At step R2, the sheet 105 to be evaluated is set on the stage 103 by the operator or by an unshown sheet feeding mechanism. At step R3, a start switch is actuated by the operator, or is actuated by a trigger signal from a sheet feeding mechanism. Then, at step R4, the vacuum device 115 is actuated to attract the sheet 105 on the stage 103. After the fixing of the sheet by the vacuum, the stage 103 is started to move at step R5. At step R6, the image processor 103 is prepared for reading the image.

When the stage sensor 1 is actuated during movement of the stage 103 (R7), the image processor 107 starts to read the image data at step R8. It reads the image for the image reading area preset for the forward movement of the stage in the image processor 107. At step R9, the image data input is completed. The image data obtained by the image processor 107 are processed for each of the evaluation items (R10-R17). At step R31, the results are supplied to the host computer 109. When the stage 103 reaches the end of the moving range to actuate the stage sensor 2 (R18) after completion of image data input, the stage 103 is stopped at step R19. Immediately thereafter, the backward movement of the stage 103 is started at step R26. The image processor 107 then waits for the image data reading operation for the image area to be read during the backward movement of the stage 103. When the stage sensor 3 is actuated (R22), the image reading in the backward stroke is started (R23). When the image data for the image reading area in the backward stroke set in the image processor 107 similarly to the above, is completed (R24), the input operation of the image data is completed. The image data are processed for each of the evaluation items (R25-R30). At step R31, the results are transferred to the host computer. The host computer 109 carries out the evaluation and determination for the data taken in the forward stroke, during the image data reading operation in the backward stroke. Thereafter, it carries out the evaluation and determination for the data taken in the backward stroke. Then, it supplies the results to the display monitor 118 and the printer.

After the completion of the image data input operation in the backward stroke, the stage 103 is further moved in the backward direction. When the stage sensor 4 detects the stage 103 at the original position, the stage 103 is stopped (R33 and R34). At step R35, the vacuum device 116 is stopped, and the sheet 105 is released from the attraction. Finally, the sheet 105 is discharged from the movable stage 103 by the operator or by an unshown sheet feeding mechanism, so that the sequential operation ends.

In this embodiment, the evaluation items for the data taken during the forward stroke of the stage 103 include the print position accuracy, linearity (low frequency component and high frequency component) and local magnification. The evaluation items for the data taken in the backward stroke, pitch uniformity and image density.

Figure 18:
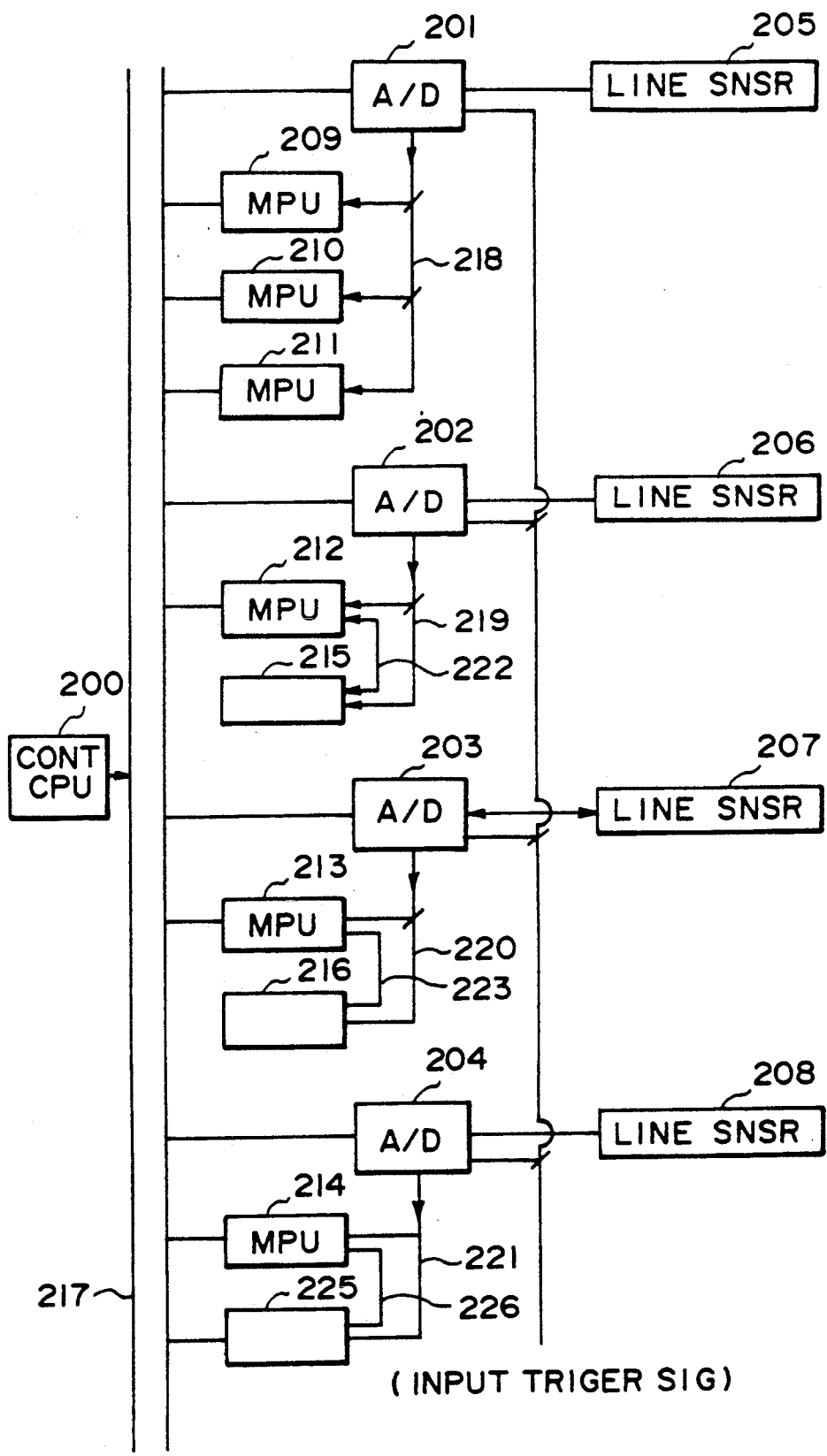
FIG. 18 is a block diagram showing details of an image processor.

FIG. 18 is a block diagram of an image processor 107 shown in FIG. 15. Designated by a reference 200 is a control CPU for controlling the entire image processor. A/D processors 201-204 supply the control signals to the line sensors 205-208 in the image pick-up device 101 and supply the image data, the timing signals and the two dimensional coordinate data to the MPU processors 209-214. The MPU processors 209-214 have image memory, which will be described hereinafter. On the basis of the image data from the A/D processors, it carries out predetermined operations, and the results of the operation are transmitted to the control CPU 200. A run code processor 215 provides a run code from binary image data supplied through the image bus and stores in its memory positional coordinate data and width data at a changing point of the binary image data. A projective data (histogram) processor 216 calculates the projective data of the multi-level image data or binary image data supplied through the image bus, on X and Y axes, and stores the results in its memory. The line sensor 205-208 are driven in response to control signals supplied from the A/D processors 201-204. The image output is supplied to the A/D processors 201-204. Through the image buses 218-221, two dimensional X and Y axes data supplied from the A/D processors 201-204, the digitalized binary or multi-level image data, the area effectiveness signal and clock signal, are supplied to the MPU processors 209-214, the run code processor 215 and the histogram processor 216. MPU buses 222 and 223 are used to supply local area information from the MPU processors 212 and 213 to the projective data processor 216 and to the run code processor 215. A system 217 functions to perform information transmission between the control CPU 200 and various processors 201-204 and 209-214. A signal line 224 functions as input start trigger signal line to input the timing at which the A/D processors 201-204 supply to the image buses 218-222 the timing signal, the image data and the two dimensional coordinate data. In this example, it is connected with the start signal for the stage 103.

Figure 19:
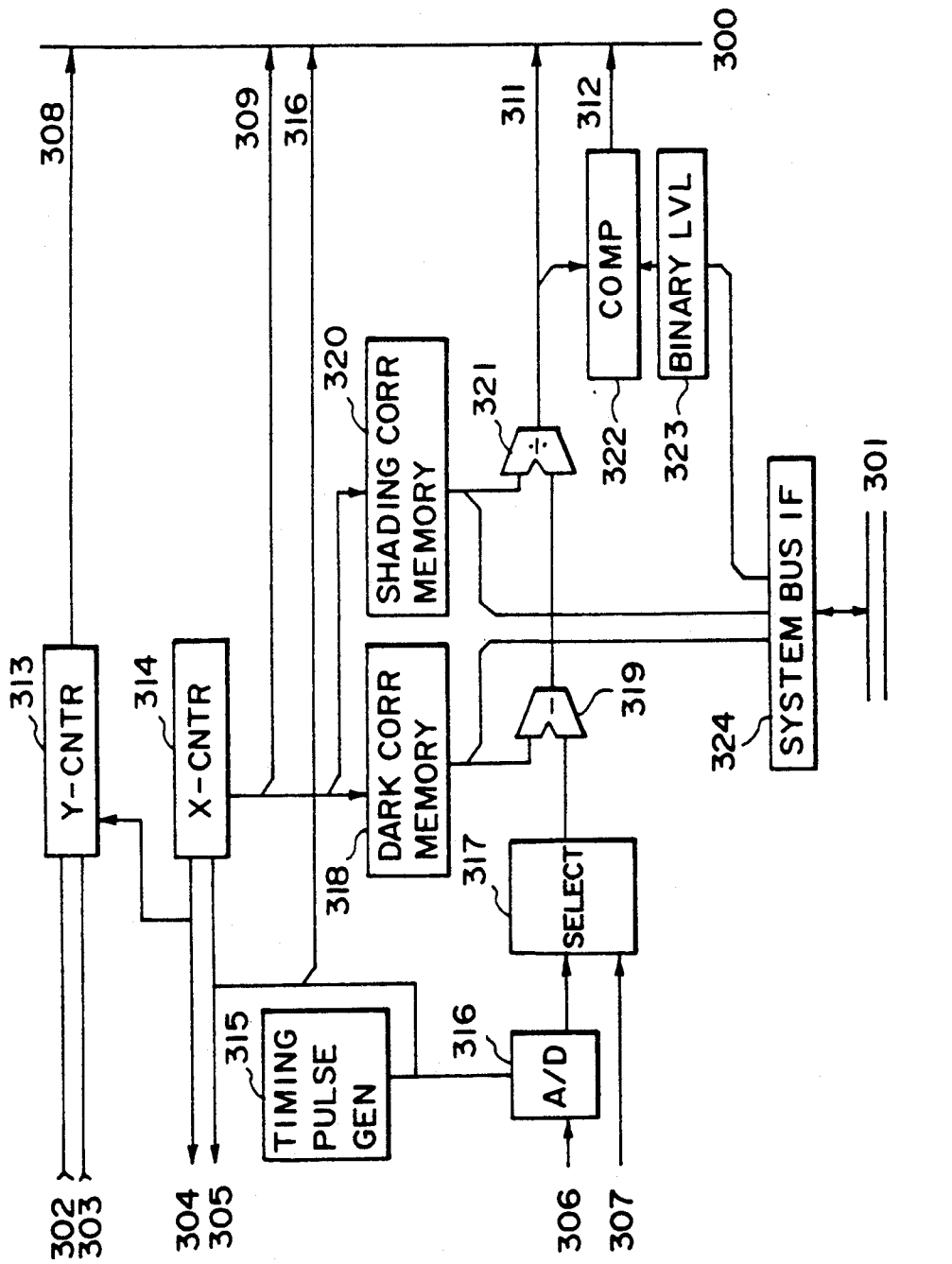
FIG. 19 is a block diagram of on A/D processor.

FIG. 19 is a block diagram illustrating the A/D processors 201-204. In this Figure, reference numeral 302 designates an image input start trigger signal input described hereinbefore; 303 is an encoder pulse signal input produced from the encoder 104 in accordance with movement of the stage 103; 304 is a scanning start pulse output for driving the line sensors 205-208; 305 is a clockpulse output for driving the line sensors 205-208; 306 is an analog image signal produced from the line sensors 205-208 driven by the A/D processor; 307 is a digital image signal produced from the line sensors 205-208 driven by the A/D processor; 315 is a timing pulse generator for producing reference clock signals and frequency divided clock signals. An X coordinate position counter 314 counts the clock signals produced by the timing pulse generator 315 for a predetermined number of clocks and generates a scanning start pulse for driving the line sensor connected thereto. It also supplies a count up pulse to a Y coordinate position counter 313 and supplies the X position data to the image bus 300. A Y coordinate position counter 313 starts in response to the input start trigger signal 302 and carries out the counting operation for a predetermined number of pulses on the basis of the count up pulse from the X position counter 314 and supplies the Y position data to the image bus 300. The Y position counter is capable of counting the Y position using the encoder pulses 303 produced in accordance with the movement of the stage 103. By doing so, the speed variation can be removed during the movement of the stage 103. An A/D converter 316 converts the analog image signal from the line sensor connected to the A/D processor to a digital signal. An input signal selector 317 selects one side depending on whether the image signal from the line sensor is analog (306) or digital (307). A dark correction memory 318 functions to store correction data predetermined on the basis of the image signals from the line sensor using a calibration chart or the like. A shading correction memory 320 stores correction data predetermined on the basis of the image signal from the line sensor using a calibration chart or the like. A subtractor 319 carries out subtracting operations between a digital level (output of the selector 317) of the image signal from the line sensor and the data in the dark correction memory. A divider 321 functions to divide the signal supplied from the subtractor 319 by the data from the shading correction memory 321. A binary level holder 323 functions to hold the binary levels. A comparator 322 compares the signal from the subtractor 321 with the binary level in the holder 323, and produces binary data. An interface 324 with a system bus 301 is connected with a system controlling CPU 200 through the system bus 301. An image bus 300 is used to supply to the respective MPU processor, the projective data processor and the one code processor, the X position data 308, the Y position data 309, the area effectiveness signal, clock signals 310, the multi-level image data 311, the binary image data 312 or the like.

Figure 20:
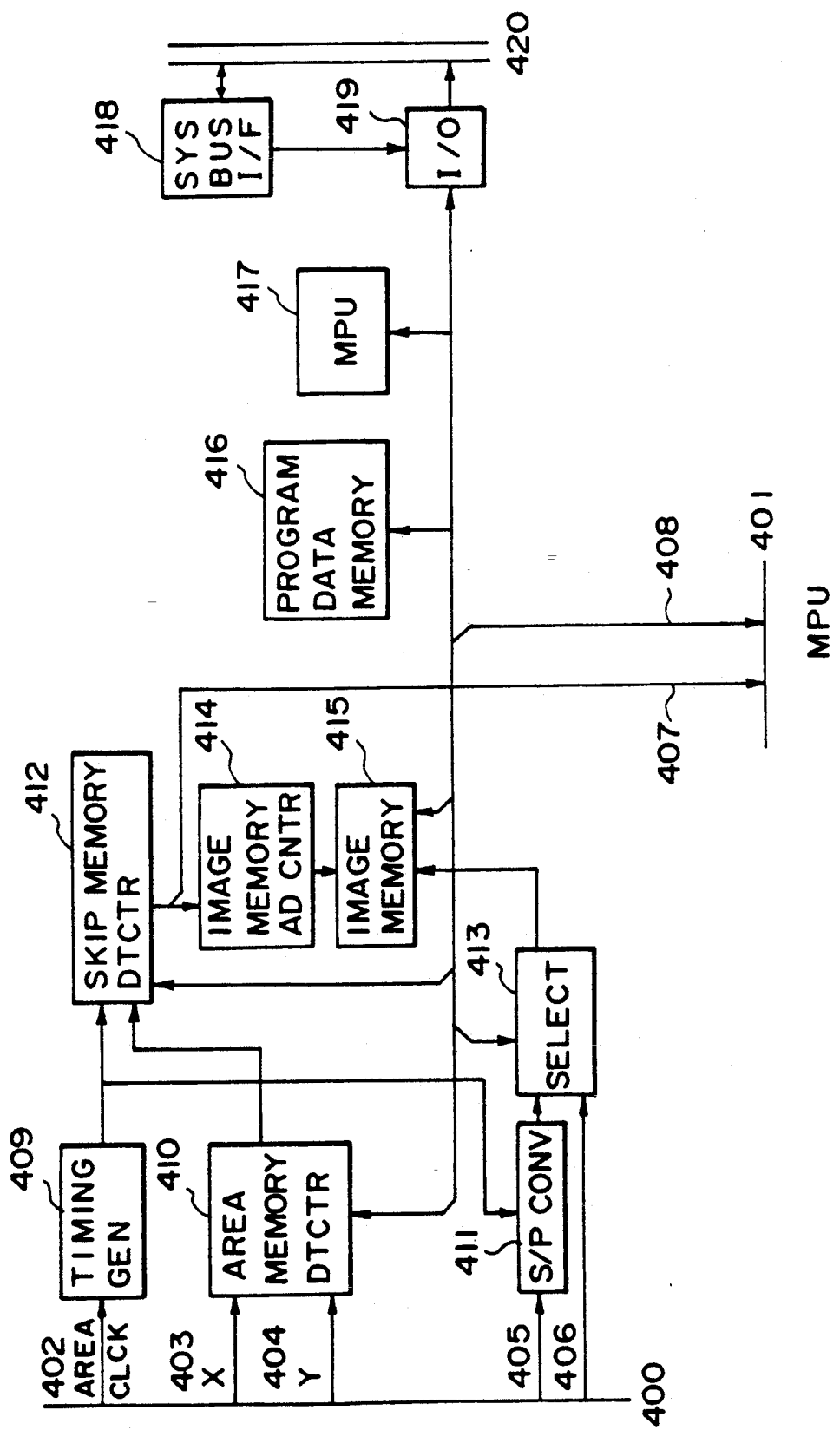
FIG. 20 is a block diagram of an details of MPU processor.

FIG. 20 is a block diagram of the MPU processors 209-214. An image bus 400 is connected with the above-described A/D processor. Reference numeral 402 designates a timing signal input such as an area effectiveness signal or clock signal or the like; 403 is X coordinate position data input; 404 is Y coordinate position data input; 405 is binary image data input; and 406 is multi-level image data input. A timing generator 409 generates a timing signal to be used in the MPU processors. An area storing and detecting means 410 stores various area information used by the MPU processors and detects the areas on the basis of the X position data 403 and the Y position data 404. For the entire coordinate positions (X, Y) designated by the MPU 417 on the MPU processor, it stores the X and Y position information corresponding to plural extracting positions required by the MPU processors. In its operation, the areas are skipped on the basis of the extracting position information, and the effective signals are produced to the detector 412. A skip storing and detecting means 412 stores the skipping amounts in the X and Y directions corresponding to the predetermined plural areas in compliance with the instructions from the MPU 417 on the MPU processors. During its operation, it produces timing signals for skipping the image data for the corresponding areas, and produces the signals to the image memory address counter 414 and the MPU bus 401. An image memory address counter 414 operates when image input instructions are produced for the image memory 415 by the effective area information corresponding to the plural areas from the skip storing detector 412 so that it increments the address counter of the image memory 415, and it generates the writing address and the writing signal and supplies them to the image memory 415. The image memory 415 is capable of storing the image data for the plural processing areas. A serial-parallel converter 411 functions to store the binary image data 405 in the image memory 415. An image data selector 413 selects the image data to be supplied to the image memory 415 and carries out the selection between the binary image data or multi-level image data. Memory 416 stores the control program and the data. An MPU 417 controls the operation and effects the image processing operation. Designated by 418 is an interface with a system bus 420. An I/O port 419 functions for information transmission between the MPU 417 and the control CPU 200. An MPU bus 401 is used to supply the MPU control signals 408 and the plural effective processing area information 407 to the run code processor and the projective data processor.

Figure 21:
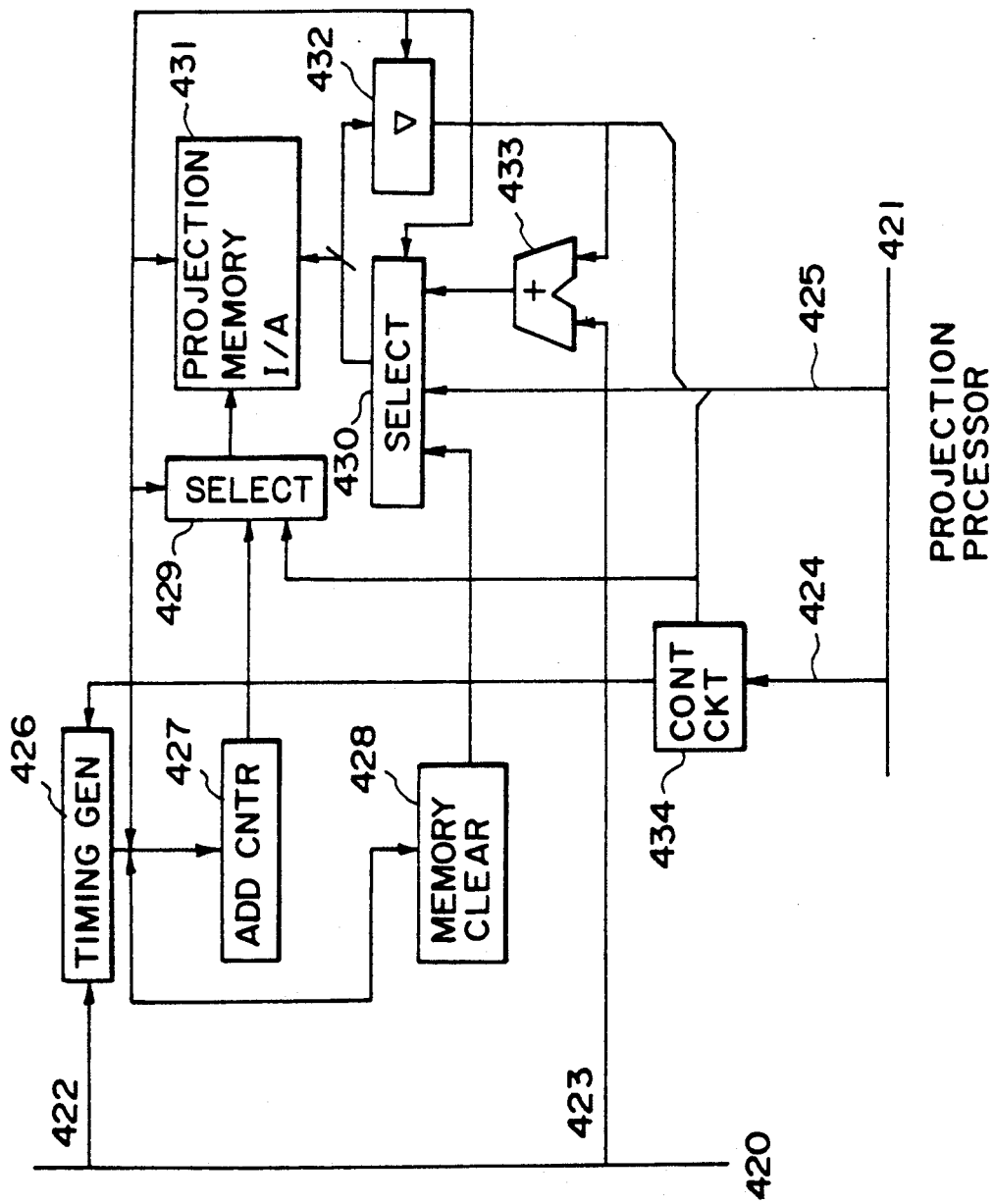
FIG. 21 is a block diagram of a projection processor.

FIG. 21 is a block diagram of the projective data processor 216. The area effectiveness signal produced from the A/D processor 203 through the image bus 220, the clock signals 422 and the multi-level image data 423 are supplied to the image bus 420. A timing generator 426 generates the timing signals required by the projective data processor. An address counter 427 generates address signals for the projective data memory 431 in response to the timing signals from the timing generator 426. A memory clear circuit 428 produces and supplies a signal for clearing the contents of the projective data memory 431. An address selector 429 for the projective data memory 431 selects the address in accordance with the clear operation, the projective data generating operation and the MPU reading operation. The selection is instructed through the MPU bus 421 from the MPU 417 of the MPU processor. Similarly, 430 is an input data selector for the projective memory; 432 is a data output buffer for the projective data memory 431. A projective data operator 433 adds the projective memory data stored in the data output buffer 432 and the multi-level image data 423 from the image bus 420, and writes the resultant data in the projective data memory 431, again. A control circuit 434 supplies the signals indicative of the conditions for producing the timing signals required for the operation of the projective data processor, from the effective area information 424 from the MPU bus 421 and the MPU bus 425, to the timing generator 426.

Figure 22:
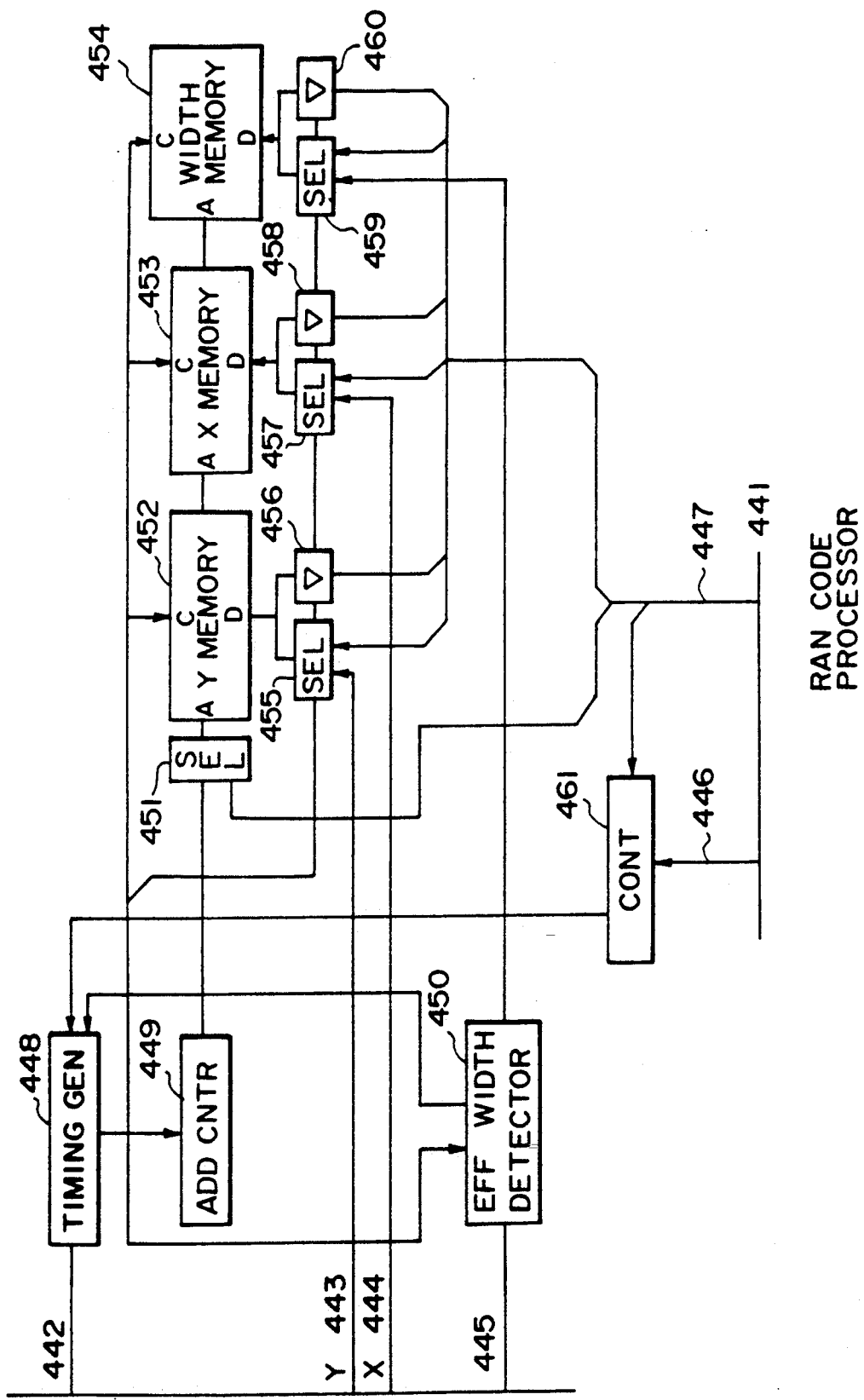
FIG. 22 is a block diagram of a run code processor.

FIG. 22 is a block diagram of the run code processor. In this Figure, reference numeral 440 designates an image bus for the area effectiveness signal and clock signals 442 which are produced from the A/D processor 202 through the image bus 220, for X coordinate position data 444, for Y coordinate position data 443 and for the binary image data 445. A timing generator 448 generates timing signals which are required for generating the run code of the run code processor. An address counter 449 generates memory addresses for the run code memories 452, 453 and 454 during the run code data generating operation. A selector 451 selects the addresses of the run code memory 452, 453 and 454 on the reading operation of the MPU of the MPU processor 212 and the run code generating operation. A Y position memory 452 stores Y position data of one run code. An X position memory 453 stores Y position data of a start or end position of one run code. A width memory 454 stores the number of picture elements in the X direction of one run code. The memories 452, 453 and 454 store to the same off-set level of the respective memories for the Y position data, X position data and X width data for one run code. Reference numeral 455 designates an input data selector for the Y position memory; 457 is an input data selector for the X position memory; 459 is an input data selector for the X direction width memory. The selectors 455, 457 and 459 are operated in accordance with the instructions from the MPU processor 212 in response to the operation of the run code processor. Reference numeral 456 designates a reading buffer from the MPU processor 212 for the Y position memory data; 458 is a reading buffer from the MPU processor 212 for the X position memory data; 460 is a reading buffer from the MPU processor 212 for the X direction width memory data. A effective width detector 450 generates instruction signals and respective writing data so that only the effective run code data are written in the run code memory means 452, 453 and 454 in accordance with the upper, lower or another set levels for the X direction width which are set by the MPU processor 212. A controller 461 controls the set levels or the like required for the operation of the run code processor in accordance with the instruction from the MPU processor 212. An MPU bus 441 functions to transfer the control signals 447 from the MPU of the MPU processor and the run code processing effective area signals 446 to the run code processor 215.

Referring to FIG. 23, the combined pattern for the print evaluation in this embodiment will be described. FIG. 23A shows an example of a print pattern for evaluating the printers using plural rollers for the sheet feeding. FIGS. 23B–F shows inspecting areas in the pattern for the various evaluation items. As will be understood, a printable region frame 502, density evaluation pattern 503, local magnification pattern 504 and pitch horizontal lines 505 are printed out on one inspection sheet 501. The data is read from the inspecting areas 506–511 by the print evaluation apparatus, and the top end registration, left end registration, the perpendicularity, the inclination, being, sheet feed pitch uniformity, jitter, the entire magnification, the pitch uniformity, jitter, the entire magnification, the local magnification, and the density, are evaluated.

Figure 23A:
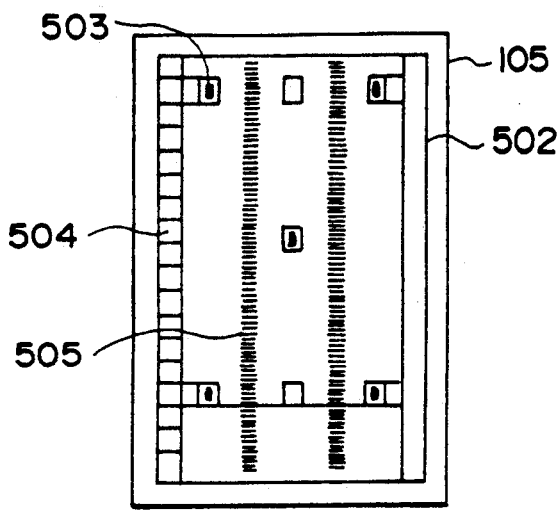
FIGS. 23(a-f) which show a combined pattern for the print evaluation according to a second embodiment.
Figure 23B:
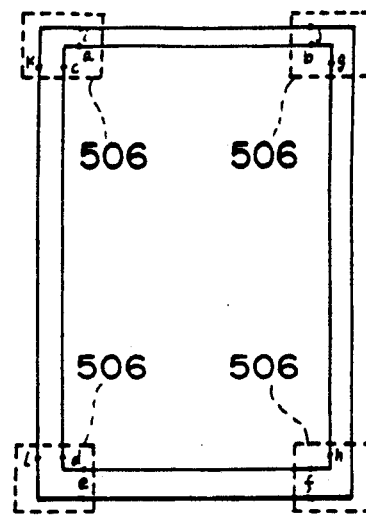
Figure 23C:
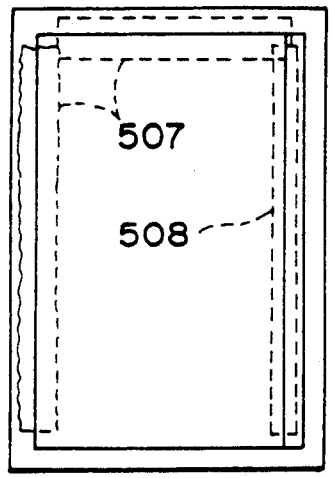
Figure 23D:
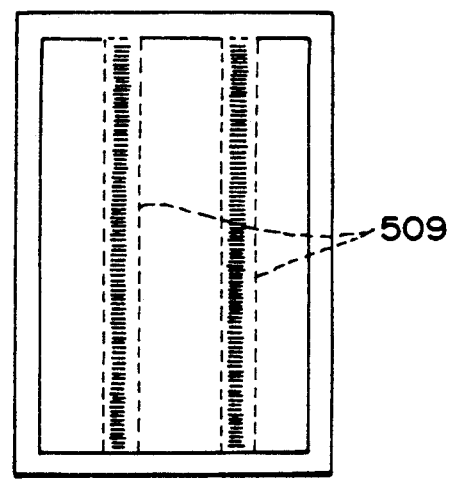
Figure 23E:
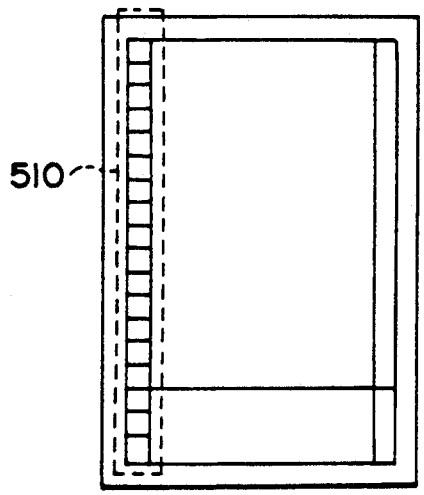
Figure 23F:
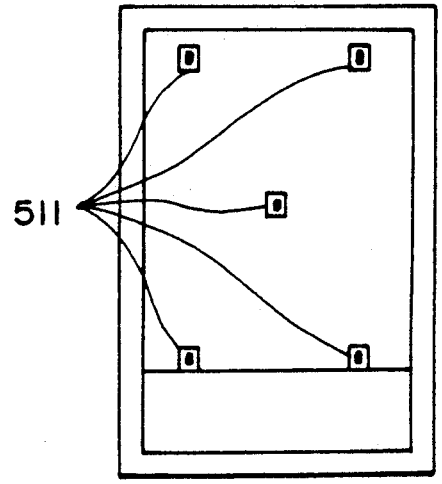

Referring to FIGS. 23A–23F, the sampling of the image will be described. FIG. 23A shows the combined pattern on the inspection sheet 105. The printable area frame 502 contains the density inspecting pattern 503, the local magnification inspecting pattern 504, and the predetermined pitch horizontal lines 505 are printed. FIG. 22B shows the print position accuracy inspecting pattern and the image processor sampling or extracting area 506 from the combined pattern. FIG. 23C shows the linearity inspecting pattern and the extracting areas 507 and 508 from the combined pattern shown in FIG. 23A. FIG. 23D shows the pitch non-uniformity detecting pattern and the extracting area 509 from the combined pattern shown in FIG. 22A. FIG. 23E shows the local magnification measuring pattern and the extracting area 510 from the combined pattern of FIG. 23A. FIG. 23F shows the local magnification inspecting pattern and the extracting area 511 therefor from FIG. 23F. For the respective evaluation or inspecting items, the image processors shown in FIG. 18 are operated.

The MPU processor 209 extracts the image data for the image extracting area 506 (FIG. 23B) from the image data which are read by the line sensor 205 during the forward stroke of the stage 103 through the A/D processor 201, and inspects the print position accuracy in the manner which will be described hereinafter. The MPU processor 210 extracts the image data for the image processing extracting area 507 (FIG. 23C) from the data which are generated from the A/D processor 201 in the forward stroke of the stage 103. The MPU processor 210 extracts the image data for the extracting area 511 (FIG. 23F) from the image data which are generated by the A/D processor 201 during the backward stroke of the stage 103. The MPU processor 211 extracts the image data for the extracting area 510 (FIG. 23E) from the image data which are generated from the A/D processor 201 during the backward stroke of the stage 103. The MPU processor 212 extracts the image data for the extracting area 508 (FIG. 23C) from the image data which are read by the line sensor 206 and generated through the A/D processor 202. The run code processor 215 connected to the MPU processor 212 through the MPU bus 222 produces and stores the run code data from the extracted image data, as described in the foregoing. The MPU processor 212 inspects the linearity high frequency components on the basis of the run code data, in the manner which will be described hereinafter. The MPU processors 213 and 214 extract the image data for the respective areas of the extracting area 509 (FIG. 23D) from the image data which are read by the line sensors 207 and 208 during the backward stroke of the stage 103 and produced through the A/D processors 203 and 204. The projective data processors 216 and 225 connected to the MPU processors 213 and 214 through the MPU buses 223 and 226 generate the projective data and store them. The MPU processors 213 and 214 inspect the pitch non-uniformity from the projective data in the manner which will be described hereinafter. The above-described MPU processors receive from the control CPU 200 the information relating to the extracting area positions, the number of areas, the skipping intervals, and carry out the image data input, run code processing and projective data processing operations or the like. Thus, the required image information is provided. Then, the selected image processing operations are carried out, and the image position, the line width or other results are supplied to the control CPU 200.

Figure 24:
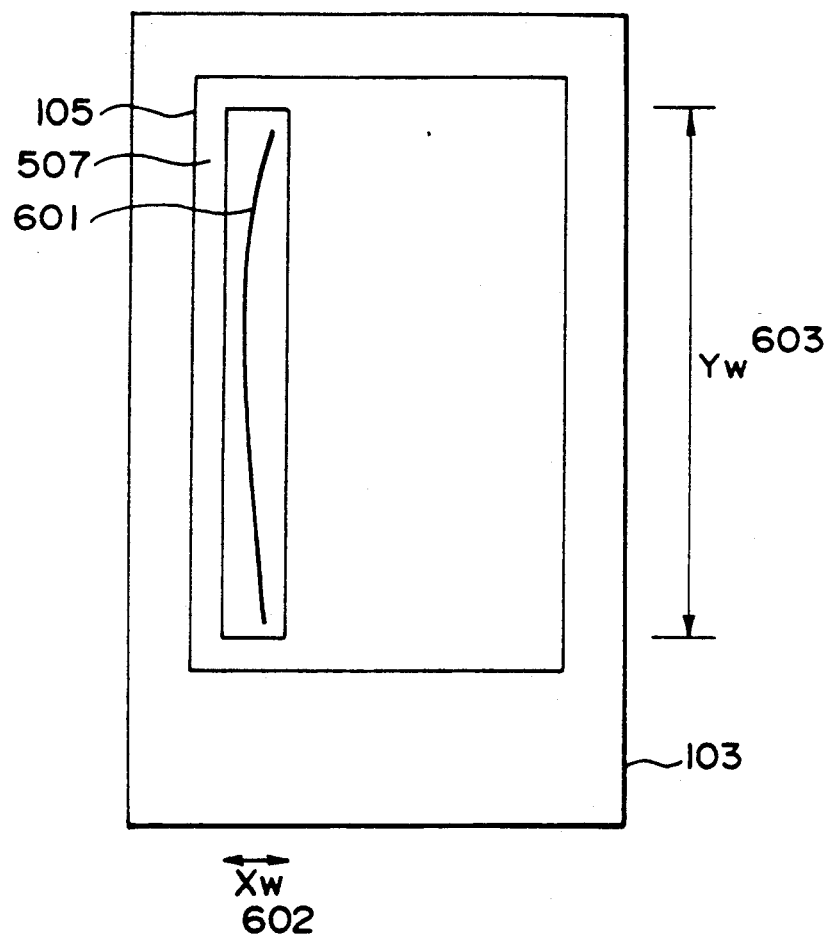
FIG. 24 shows a partial reading area of the combined pattern.

Referring to FIG. 24, a description will be made as to the skipping function during the image data sampling operation.

FIG. 24 deals with the low frequency component linearity inspection. Designated by a reference 601 is a line image in the image processing extraction area 507 on the sheet 105 to be inspected; 602 is an X direction area width (Xw) of the extraction area 507; and 603 is the Y direction width thereof.

Figure 25B:
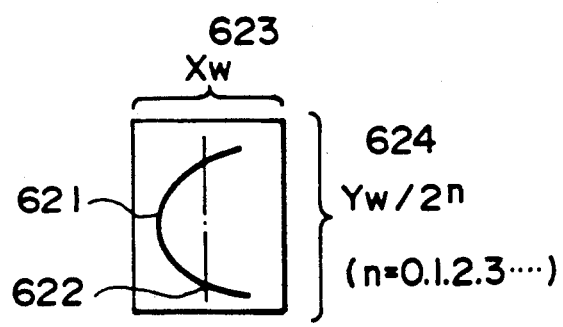
FIGS. 25(A,B) illustrate memory storing image data of the reading area.
Figure 25A:
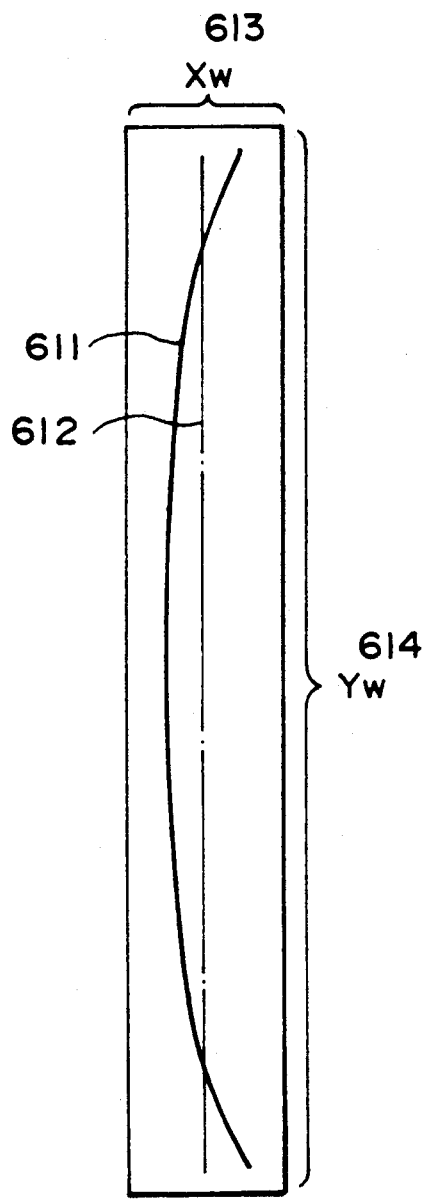

FIG. 25A illustrates the content of the memory when the image data in the extracted area 507 are all stored without skipping. Reference numeral 611 designates the line image in the image memory; 612 is a phantom line to which the line image 611 is approximated; 613 is the X direction area width similar to 605; 614 is the Y direction area width similar to 606.

FIG. 25B illustrates the content of the image memory of the extracted area 507 when the image data are skipped. Reference numeral 621 designates a line image in the image memory; 622 is a phantom line to which the line image 621 is approximated; 623 is the X direction area width similar to 605; 624 is a Y direction area width similar to 606. Here, when the skipping is carried out in the Y direction, the required amount of the image memory is $\frac{1}{2^n}$ when the skipping amount is $2^n$. Therefore, the image memory can be saved, and the information is compressed, so that the processing operations are made easier. In this embodiment, the phantom lines 612 and 622 are determined from the line images 611 and 621, and the linearity is determined from the difference between the phantom rectilinear line and the X direction position, and this embodiment is particularly advantageous in the case wherein the X direction variation is small as compared with the Y direction variation.

A description will be made as to the parallel processing operations for the plural evaluation items. In the following description, the parallel processing operation by the A/D processors 201, 202 and 203, the MPU processors 209, 212 and 213 and the line sensors 205, 206 and 207 are as shown in FIG. 18.

Figure 26:
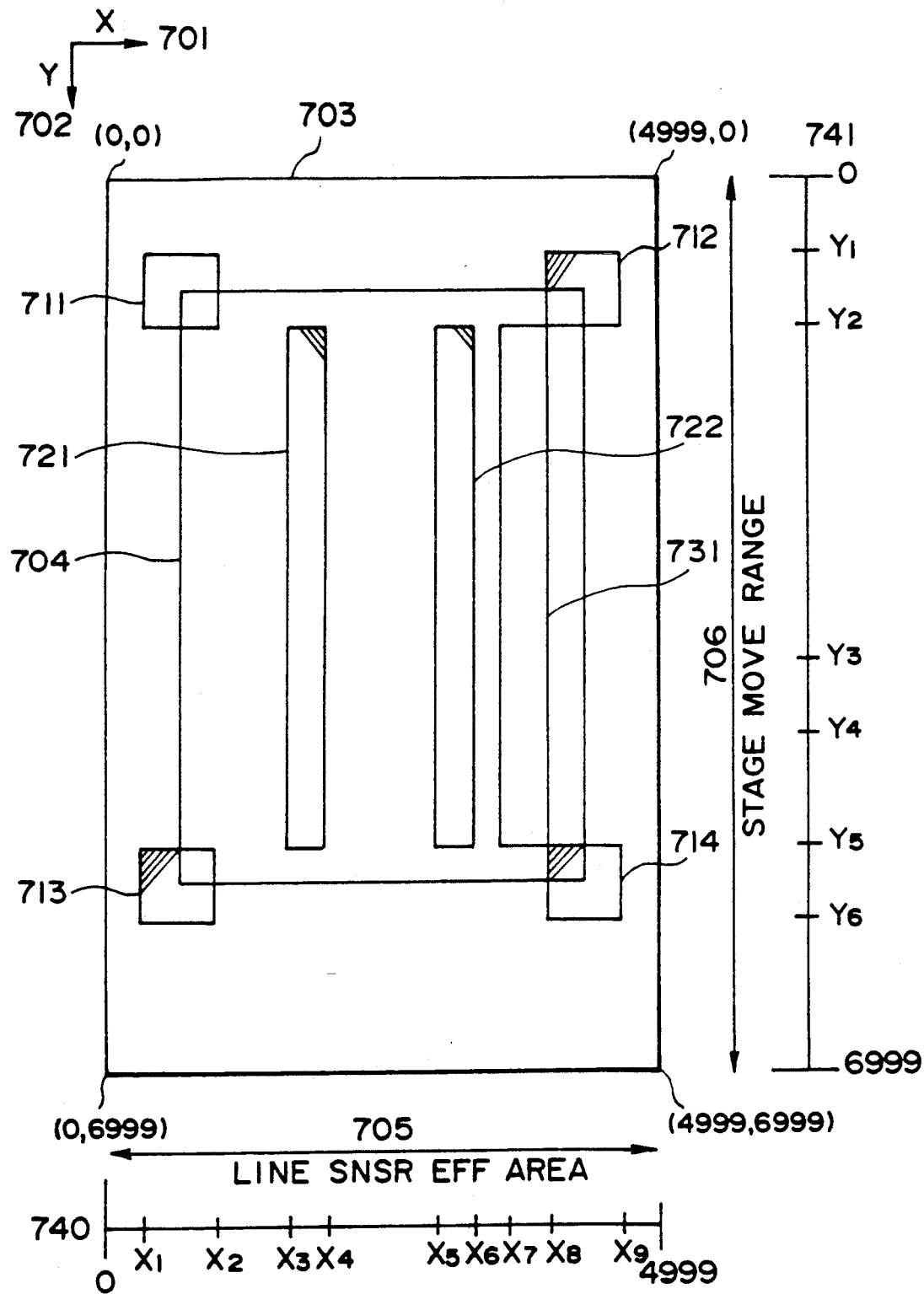
FIG. 26 shows a relation between absolute coordinates on the stages and areas of the combined pattern.

FIG. 26 illustrates the parallel processing operation for the image to be evaluated or inspected. In this Figure, reference numeral 701 designates a scanning direction (X direction) of the image pick-up device (line sensor) 101 of FIG. 15; 702 is a stage 103 moving direction (Y direction). An area 703 occupied by the absolute coordinate generated by the A/D processors 201-204, and in this example, the data are 0-4999 in the X direction, and 0-6999 in the Y direction. A reference numeral 704 designates a pattern image on the sheet to be inspected which constitutes a combined pattern (FIG. 23) to be inspected; 705 is an image effective area (X direction) for the line sensor; 706 is a stage moving area (Y direction); 711, 712, 713 and 714 are areas from which the images are taken by the MPU processor 209 and correspond to the areas 506 in FIG. 23B; 712 and 722 are areas to be extracted by the MPU processor 213 and correspond to the area 509 of FIG. 23D; 731 is an area taken by the MPU 212 and corresponds to the area 508 of FIG. 22C, 704 is the X coordinate position of the area to be processed by each of the MPU processors; 741 is the Y position thereof. In one of square areas 711 to be extracted by the MPU 209 ranges between X1–X2 in the X direction and between Y1–Y2 in the Y direction. Similarly the area 712 ranges from X7 to X8 and from Y1 to Y2; the area 713 ranges from X1 to X2 and from Y5 to Y6; the area 715 extends from X7 to X8 and from Y5 to Y6; the area 721 ranges from X3 to X4 and from Y2 to Y5; the area 722 extends from X5 to X6 and from Y2 to Y5; and the area 731 ranges from X7 to X8 and from Y2 to Y5.

Figure 27:
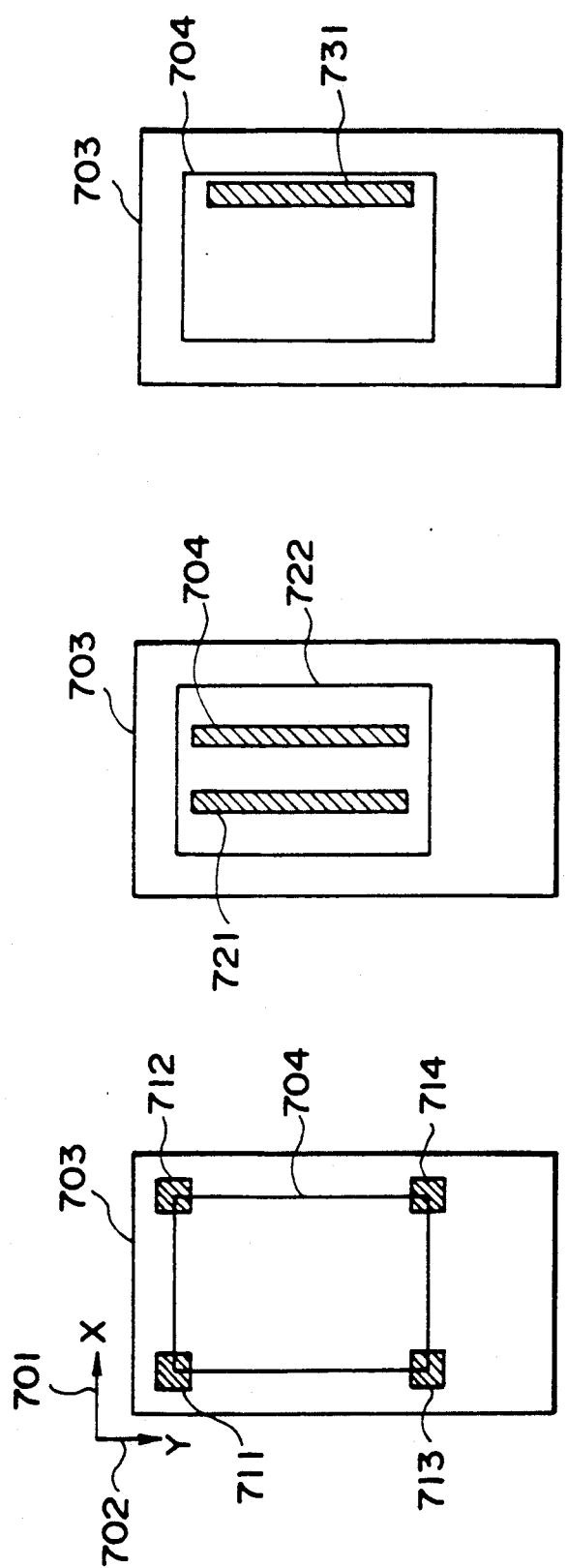
FIGS. 27(A-C) illustrate the processing area allotted to the MPU processors.

FIG. 27 illustrates the correspondence between the MPU processors and the areas to be processed. FIGS. 27A, 27B and 27C show the areas processed by the MPU processor 209, the MPU processor 213 and the MPU processor 212, respectively.

Figure 28:
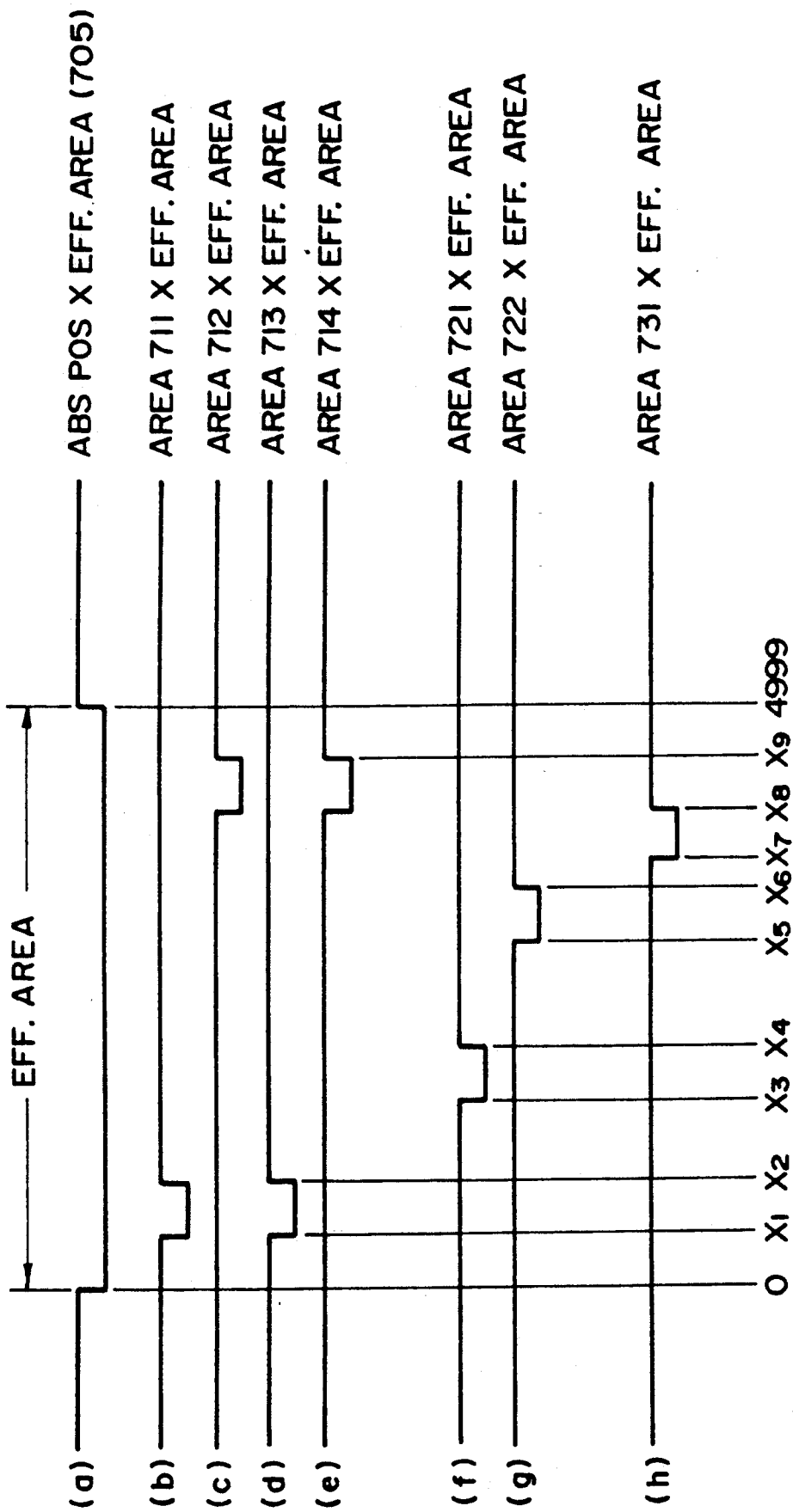
FIG. 28 is a timing chart showing the extracting timing in the direction X for each of the areas.

FIG. 28 is a timing chart in the X direction for the area extraction in the parallel processing operation. In uses active low logic.

In FIG. 28, (a) designates effective areas for the line sensors 205, 206 and 207, and during the low period, the A/D processors 201, 202 and 203 generate the X data 309 to the image bus 218 through the image bus 300; (b) shows X direction area effective signals for extracting the area 711 of FIG. 26 from the areas to be processed by the MPU processor 209; (c) designate X direction area effective signals for extracting the area 712 of FIG. 26 to be processed by the MPU processor 209, and the signals indicate "effective" from X8 to X9; (d) designates X direction area effective signals for extracting the area 713 of FIG. 26 to be processed by the MPU processor 209, which are effective from X1 to X2; (e) designates X direction area effective signals for extracting the area 714 to be processed by the MPU processor 209; (f) designates area effective signals in the X direction for extracting the area 721 to be processed by the MPU processor 213 which are effective from X3 to X4; (g) designates area effective signals in the X direction for extracting the area 722 to be processed by the MPU processor 213, which are effective from X5 to X6; (h) designates X direction area effective signals for extracting the area 731 of FIG. 26 to be processed by the MPU processor 212, which indicate the effectiveness in the range from the position X7 to the position X8.

Figure 29:
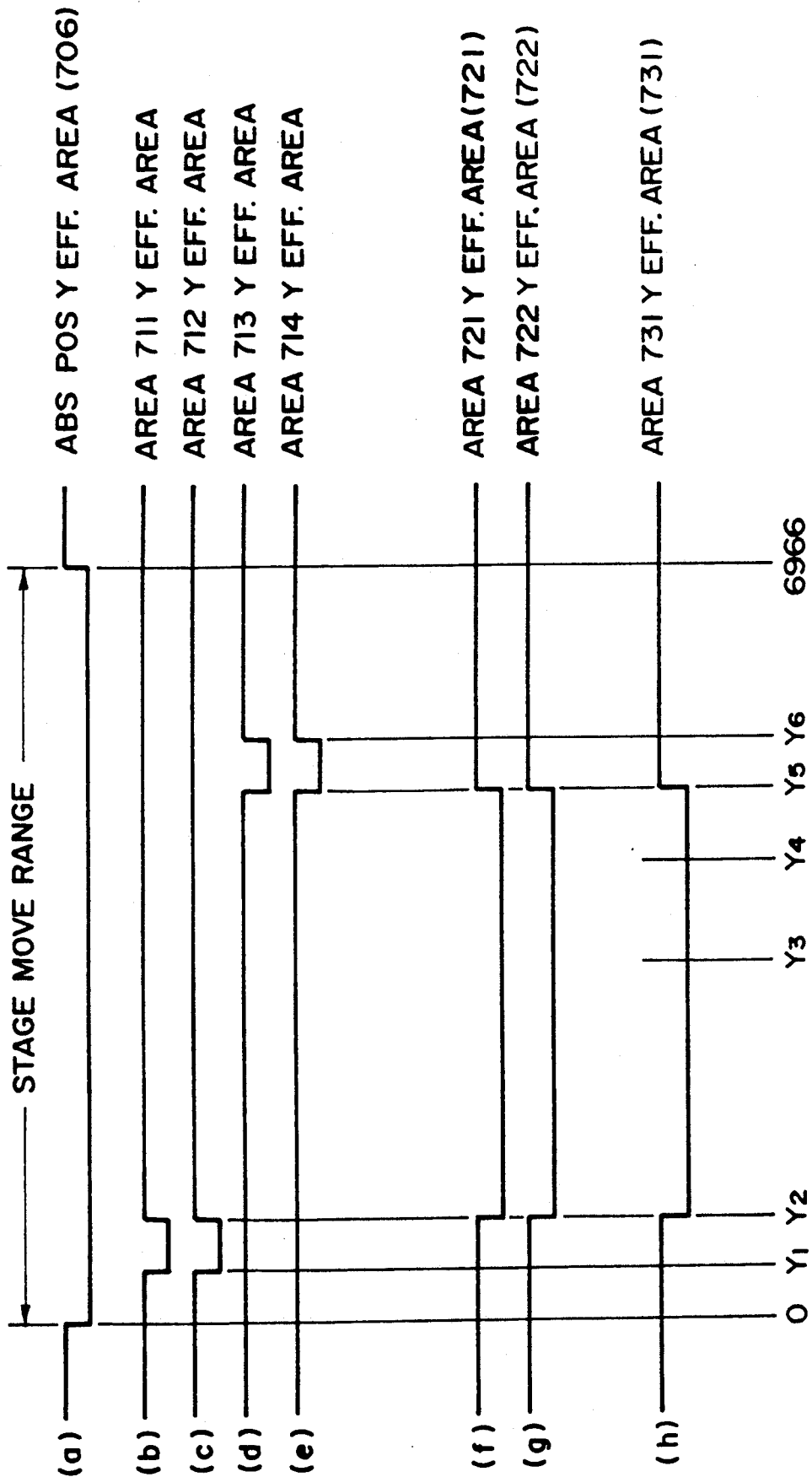
FIG. 29 is a timing chart showing extracting timing in the direction Y for each of the areas.

FIG. 29 is a timing chart in the X direction for extracting the area during the parallel processing in the active low logic, similarly. In this Figure, (a) designates the effective area during the stage movement, and during the low period, the A/D processors 201, 202 and 203 supply the Y positioned data 308 to the image bus 218 through the image bus 300; (b) designates Y direction area effective signals for extracting the area 711 of FIG. 26 to be processed by the MPU processor 209, which indicate effectiveness from the position Y1 to the position Y2; (c) designates Y direction area effective signals for extracting the area 712 of FIG. 26 to be processed by the MPU processor 209, which indicate effectiveness from X1 to X2; (d) designates Y direction area effective signals for extracting the area 713 of FIG. 26 from the area to be processed by the MPU processor 209, which indicate effectiveness from Y5 to Y6; (e) designates Y direction area effective signals for extracting the area 714 of FIG. 26 to be processed by the MPU processor 209, which indicate effectiveness from Y5 to Y6; (f) indicates Y direction area effective signals for extracting the area 721 of FIG. 26 to be processed by the MPU processor 213, which indicates effectiveness from Y2 to Y5; (g) indicates Y direction area effective signals for extracting the area 722 to be processed by the MPU processor 213, which indicate effectiveness from Y2 to Y5; and (h) designates Y direction effective signals for extracting the area 731 of FIG. 26 from the area to be processed by the MPU processor 212.

In FIGS. 26 and 27(A–C), the starting position Y1 and the ending position Y2 of the area to be extracted are the same for 711 and 712, for example. They may be different. The same applies to the X direction. The same areas may be inputted to different MPU processors, and different areas to be extracted may be partly or entirely overlaid for the same MPU processors.

The operations will be described by the system of FIG. 14 having the image processor shown in FIG. 18. The stage starts to move from its original position, and a start trigger signal 224 (302) is supplied to the A/D processor 201 when it comes to a predetermined position. Then, A/D processor 201 produces absolute coordinate position data for the area 703 shown in FIG. 26, more particularly, 0–4999 in the X direction and 0–6999 in the Y direction, between which the coordinate data are supplied to the image bus 218. Beforehand, the MPU processors 209–211 have been supplied with the image areas, from the control CPU 200, which should be extracted by the MPU processors relative to the absolute coordinates. The program for processing the input image is stored in each of the MPU processors. The line sensor 205 is driven by the A/D processor 201, and generates image signals and supplies them to the A/D processor 201. At this time, the X position counter 313 counts up in accordance with one scan of the line sensor, and the absolute coordinate data (0–4999 in the X direction) are supplied to the image bus 218 from the A/D processor 210. Similarly, the Y direction absolute coordinate data are generated after the stage start signal 224 is supplied to the A/D processor 201, and the Y position counter 313 counts up by one scan of the line sensor 205, and supplies the count to the image bus through the A/D processor 201. This is continued until the predetermined coordinate position is reached. In the example of FIG. 25, this is continued from the coordinate position 0 to the coordinate position 6999. Each of the MPU processors 209-211 starts the input of the image and writing in the image memory when the absolute coordinate position reaches the position corresponding to the associated area. Since the MPU processors operate independently from each other, the processing operations are carried out in parallel simultaneously in the entire image processing system. In FIG. 26, after each of one scan operation in the X direction from 0 to 4999, the Y position is counted up by one. When the Y position becomes Y1, and the X position becomes X1, the event means the first image extracting area is reached. It is the area 711 to be processed by the MPU processor 209. Then, the first one line data to the position X2 are stored in the image memory 415 in the MPU processor 209. Thereafter, the first one line data for the area 712 to be processed by the MPU processor 209 (from X7 to X8) are read, again. In this manner, the MPU processor 209 reads the image for the areas 711 and 712 until the Y position Y2 is reached. When the Y position becomes Y2, and the X position becomes X3, the event means that the area 721 to be processed by the MPU processor 213 is reached. Therefore, the MPU processor 213 reads and is reached. Therefore, the MPU processor 213 reads and stores the image information in the image memory 415. The stage continues to move, and when the Y position becomes Y6, and X position becomes X8, the MPU processors 209, 213 and 211 all have the necessary image information. When each of the MPU processors stores the associated image data in the image input area in its image memory, it starts the different processing operation (or the same processing operation). After completing the processing operation, the results are supplied to the control CPU 200 in response to the instructions from the control CPU 200. This is the end of the sequential operations.

Figure 31:
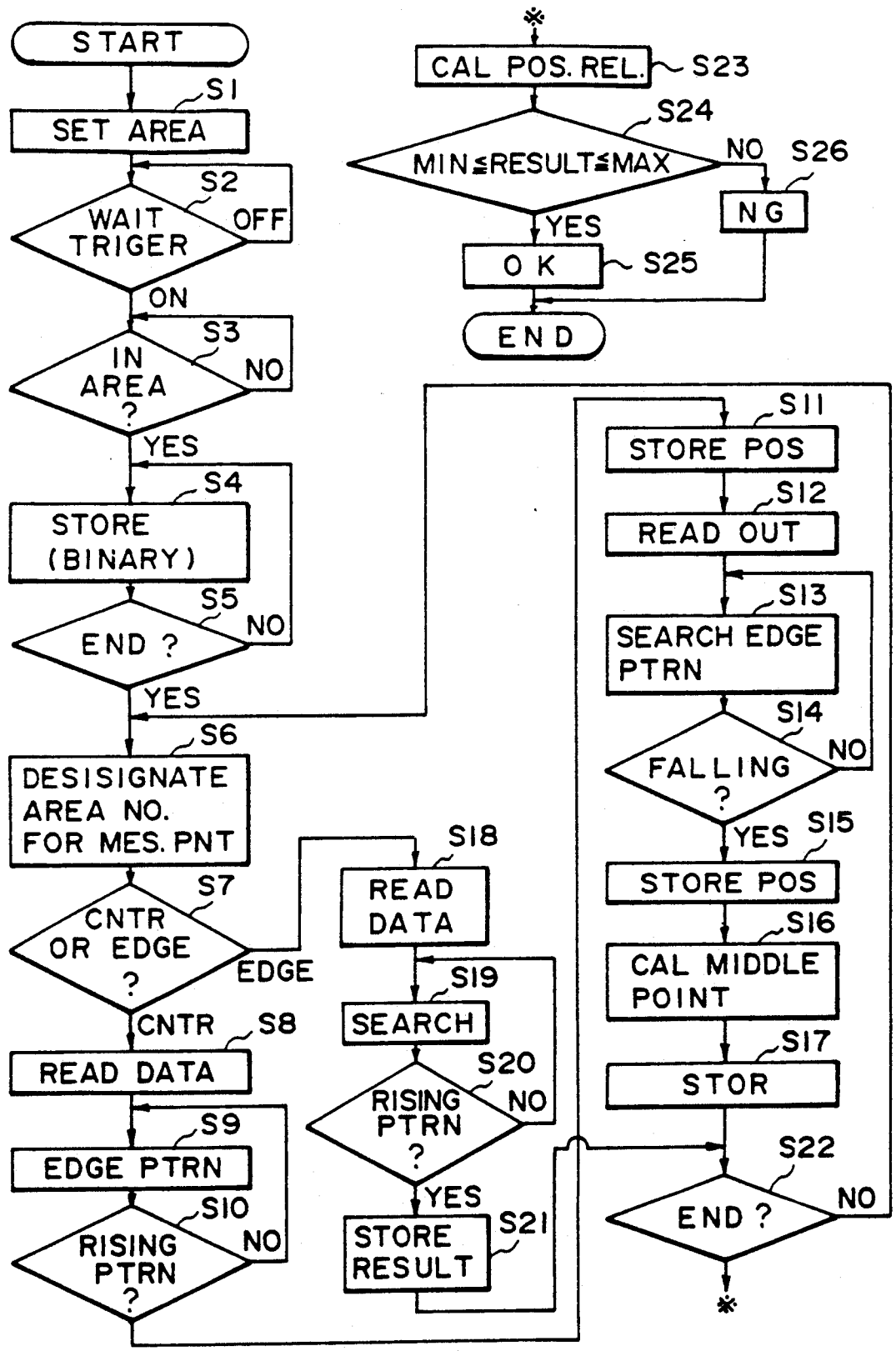
FIG. 31 is a flow chart of a print position accuracy evaluation method in the second embodiment.

Referring to FIG. 31, the method of evaluation for the print position accuracy will be described. This is carried out by the MPU processor 209. At step S1, an image input area is set in an area storing and detecting means 410 (FIG. 20) in the MPU processor 209. The set area is as indicated by an area 506 in FIG. 23B. The black circles (a-b) in the area 506 indicates sheet end or inspecting point on the printed line. After completion of the image input area setting at step S1, actuation of the input start trigger signal 202 which is the image input trigger signal is awaited at step S2. When the input start trigger signal 302 becomes actuated, the image input is started, and at step S3, the discrimination is made as to whether the X and Y positions of the input image data are within the area 506. If so, the data are stored in the image memory 415 as the image data binarized at the predetermined binary levels. If not, the system awaits the input of the image data in the selected area. At step S5, the discrimination is made whether or not the input area is completed. If the X and Y positions of the image data being inputted are within the set area, the operation returns to step S4, and continues to store the image data in the image memory 415. If the X and Y positions of the image data reach the end positions of the area 506, the storing operation is stopped. Then, the operation branches out to step S6, where an area number for the inspecting point is designated. In the example of FIG. 23B, the area number is set to "1" if the inspecting points are a, c, k and i. At step S7, selection is made between the sheet end and the line center. In the example of FIG. 23B, the inspecting points i, j, k and l correspond to sheet ends, and the inspecting points a, b, c, d, e, f, g and h correspond to line centers. If the line center is selected at step S7, the operation branches out to step S8 where the image data for the portion corresponding to the designated area number out of the image data stored in the image memory 415 are read out. The read data are binarized so that the sheet portion is "0", and the printed line and the top surface of the stage 103 on which the sheet is set are "1". At step S9, the binarized edge pattern of the printed line is searched. The data of the printed lines are such that datum 0 (sheet) continues, and plural "1" appear, and thereafter, "0" continues again. At step S10, the point at which the datum changes from 0 to 1, that is, the rising edge is detected. When the rising pattern is detected, the coordinate position of the changing point is stored at step S11, and the image data are read out, again at step S12. At steps S13 and S14, the similar processing as steps S9 and S10 are carried out. However, at step S14, the point at which the binary datum changes from "1" to "0", that is, the falling edge of the pattern. If the falling pattern is detected, the coordinate position of the changing point is stored at step S15. At step S16, an intermediate point between the rising edge point stored at step S11 and the falling point stored at S15 is calculated, and at step S17, the coordinate position of the print center is stored at step S17.

If the sheet end is the inspecting point, the operation branches out from S7 to S18 where among the data stored in the image memory 415, the image data corresponding to the designated area number are read out. At step S19, among the binarized image data, the edge pattern at the boundary between the sheet and the stage top surface is searched. After the datum "1" corresponding to the top surface of the stage continues, the data indicative of the sheet portion "1" continues. At step S20, the position at which the data changes from "1" to "0" in the pattern, that is, the edges of the falling patterns are repeatedly detected. If the falling pattern is detected, the coordinate position of the point at which the datum changes from "1" to "0" is stored as the sheet end position at step S21. At step S22, the discrimination is made as to whether or not all of the inspecting points are covered. If not, the operations from step S6 are repeated. If all the points are covered, the operation branches to step S23, and the relative positional relation is calculated. The method of calculation in the relative positional relation is for example, top registration $= ay - iy$, and $by - ji$ perpendicularity $= |(ay-by)/(ax-bx)+(cx-dx)/(cy-dy)| \times 100(\%)$ inclination $= |((ay-iy)-(by-jy))/(ax-bx)| \times 100(\%)$ parallelism = |((ay−ey)−(by−fy))·/(ay−bx)| × 100(%)

then, at step S24, the results of each of the evaluation items is compared with the minimum limit and the maximum limit therefor and if the result is between the minimum limit and the maximum limit, a positive evaluation is made at step S25. If not, the negative evaluation is made. Then, the evaluating operation is completed.

Figure 32A:
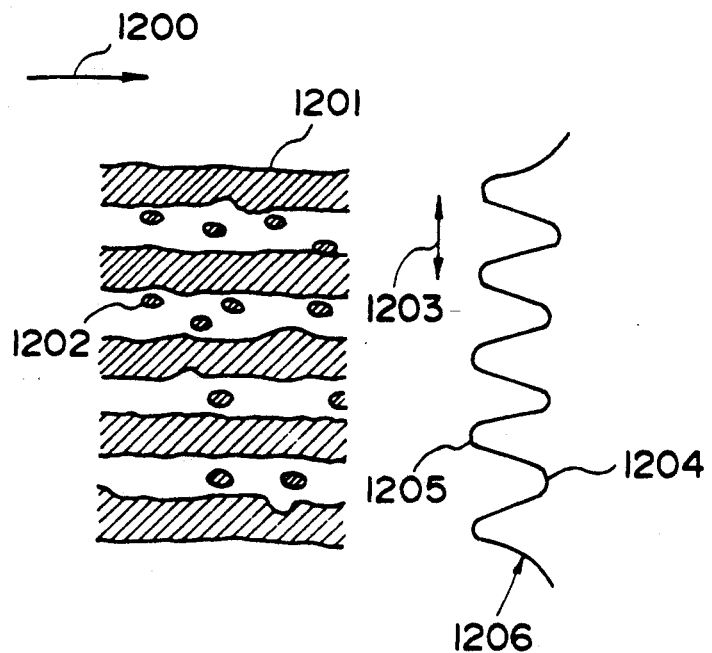
FIGS. 32(A,B) illustrate the principle of the pitch non-uniformity evaluation.

A description will be made as to the evaluation of the pitch (uniformity). FIG. 32A illustrates the projective data for a line pattern, wherein reference numeral 1201 designates a printed line pattern, and 1202 are noise components existing between lines. Reference numeral 1200 designates the length direction of the line. The projective data 1206 are the sum of the multi-level data in this direction. The portion corresponding to the line 1201 among the projective data 1206 appears as top peak 1205, and the background between the lines appears as a bottom peak 1204. By taking the projective data, the influence of the noise component between the lines and the roughness of the edge of the pattern can be removed, and the pitch 1203 between the lines can be correctly extracted.

Figure 32B:
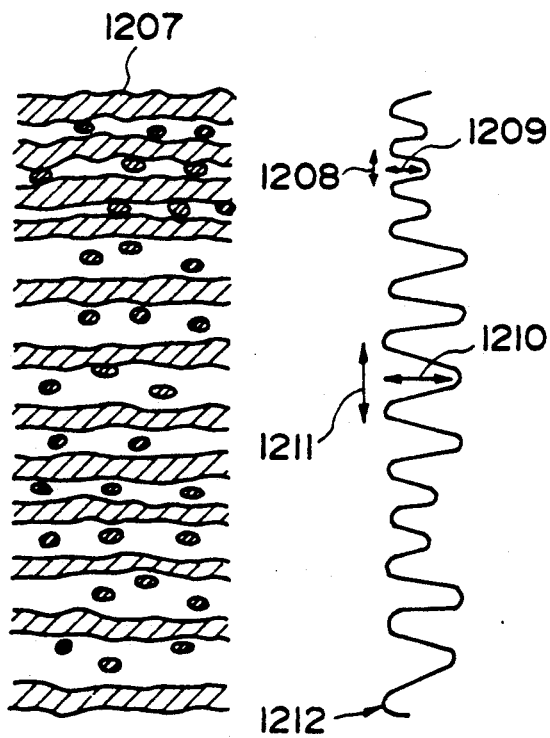

FIG. 32B illustrates an unsatisfactory state when a line pattern is printed, wherein reference numeral 1207 designates a printed line pattern, 1212 is projective data. Noting the peak positions, the unsatisfactory pitch 1208 is smaller than the correct pitch 1211. Noting the difference between the adjacent top peak and the bottom peak in the projective data 1212, the unsatisfactory peak difference 1209 is smaller than the correct peak difference 1210. From this, by calculating the pitch or the peak difference of the projective data, the unsatisfactory portion and the satisfactory portion can be separated.

Figure 33:
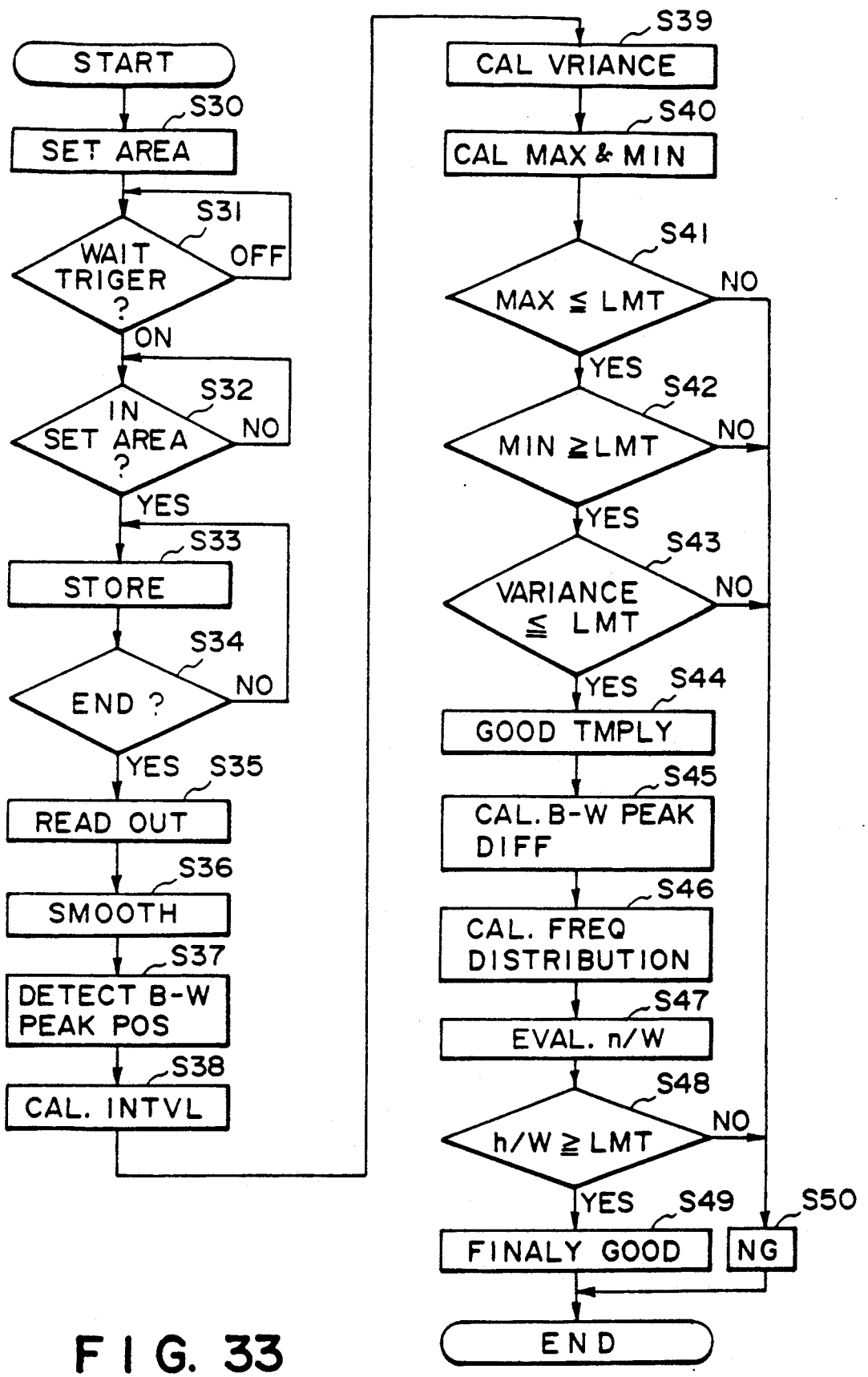
FIG. 33 is a flow chart of a pitch non-uniformity uniformity evaluation method.

Referring to FIG. 33, the method of evaluation of the uniformity of the pitch will be further described. The operation is carried out by the MPU processor 213. At step S30, the image input area is set in the area storing and detecting means 410 of MPU processor 213. The set area in this case is as shown by area 509 in FIG. 22(d). After the setting of the image input area is completed, the actuation of the input start trigger signal 302 which is the image input trigger signal, is awaited at step S31. When the input start trigger signal 302 becomes actuated, the image input is started. At step S32, the discrimination is made as to whether or not the X and Y positions of the image data are within the area 509. If so, the projective data is stored in the projective memory 431 of the projective data processor 216 at step S33. If it is outside the area, the image input is continued until the set area is reached. At step S34, the end of the set area is discriminated. if it is still within the area, the storing of the projective data is continued at step S33. If the input area ends, the operation branches to S35.

At step S35, the inputted projective data are read out, and the data are smoothed at step S36. Here, the smoothing operation is carried out so as to remove the spike-like noise in the projective data, and therefore, to make the discrimination of the peak positions easier.

At step S37, the white portion (background) and the black portion (the peak positions of the line pattern) are detected. As for the method of detecting the peaks, the difference between the adjacent projective data is taken, and the discrimination is made as to whether or not the sign (positive or negative) of the difference is positive or negative. If the sign changes from the positive to the negative or from negative to the positive, the changing position is discriminated as the peak position. When the difference is zero, the central point of the zero position is taken as the peak position. As for the method of detecting the peak position, the gravity positions of the range in which the top and bottom exist, and the gravity point may be discriminated as the peak position. At step S38, the interval between the adjacent peak positions is calculated, and it is taken as the pitch.

At step S39 the variance of the pitches obtained by the step S38 is determined. At step S40, the maximum and the minimum of the pitches obtained by the step S38 are determined. At step S41, the maximum obtained by the step S40 is compared with the maximum tolerable limit, and if the maximum is smaller than or equal to the limit, step S42 is executed. If it is larger, step S50 is executed, and the negative evaluation is made at this point. At step S42, the minimum of the pitches obtained by the step S40 is compared with the minimum tolerable limit, and if the minimum is larger than or equal to the limit, step S43 is carried out. If the minimum is smaller than the limit, step S50 is executed, and the negative evaluation is made at this stage. Then, at step S43, the variance determined at step S39 is compared with the tolerable limit of the pitch variance. If the variance is smaller than or equal to the limit, step S44 is carried out. If the variance is larger than the limit, S50 is executed, and the negative evaluation is made at this stage.

Here, when the pitch intervals change periodically, for example, when the even number pitches and the odd number pitches alternately change, or the like, an average of the odd number pitches and the average of the even number pitches are determined in place of the comparison between the maximum and the minimum, and the evaluation may be made on the basis of whether the difference exceeds the reference.

At step S44, if the requirements at the steps S41–S43 are satisfied, the positive evaluation is temporarily made. It is temporary, because even if the pitch is good, the printed image involved density non-uniformity, and therefore, the print quality is degraded if the contrast between the line pattern and the background varies. In order to make an evaluation from this standpoint, at step S45, the peak difference between the white and black portions, that is, the height between the adjacent bottom peak and the top peak is calculated. At step S46, the frequency distribution of the peak differences obtained by the step S45 is calculated. If the contrast is constant, a high frequency distribution appears at a certain peak difference position, and the variation of the frequency distribution is small. On the contrary, if the contrast is not uniform, the height of the frequency distribution is low, and the frequency distribution varies significantly. Therefore, a evaluation function is taken as h/w where h is the height of the frequency distribution, and w is a width of the bottom thereof. At step S47, the evaluation function is calculated, and it is taken as the state value for the contrast. At step S48, the state value of the contrast obtained by the step S47 is compared with the tolerable limit therefor. If the state value is larger than or equal to the limit, a step S49 is executed where the final positive evaluation is made, and the pitch uniformity evaluation operation ends. If the state value of the contrast is smaller, step S50 is executed where the negative evaluation is made, and the pitch uniformity evaluation operation ends.

Figure 35A:
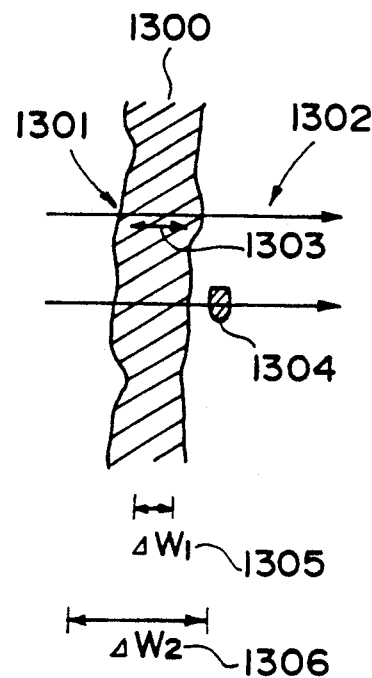
FIGS. 35(A,B) illustrate the principle of the linearity evaluation.
Figure 35B:
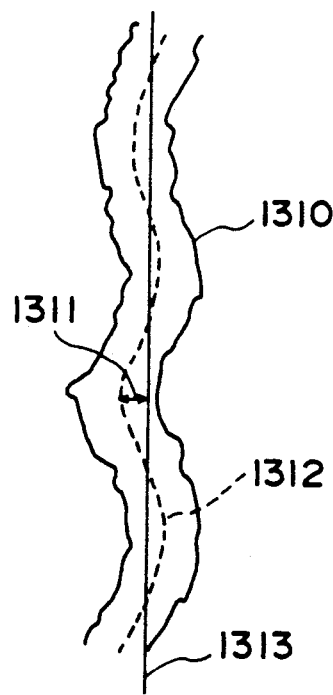

FIG. 34A shows the peak difference frequency distribution when the contrast is constant (positive evaluation). FIG. 34B shows the peak difference frequency distribution of the negative evaluation case in which the contrast varies, where h1 and h2 are the maximums of the frequency distribution, and w1 and w2 are bottom widths of the frequency distribution. The description will be made as to the linearity of the printed lines. FIGS. 35(A,B) illustrates the run code data used when the high frequency component of the linearity of the print pattern is evaluated, wherein 1300 is a printed line pattern, and 1301 is the scanning position to obtain the run code data. The starting point and the width of the binary figure on the scanning line are sequentially stored. If the line pattern as shown in FIG. 1300 is scanned, the X position of the starting point of the line pattern is stored in the X memory 452 in the run code processor 215, and the Y position is stored in the Y memory 453 in the run code processor 215, and the pattern width 1303 is stored in the width memory 454 in the run code processor 215. Around the line pattern 1300, the noise component 1304 exists, and therefore, when the run code data is taken, a maximum width limit 1306 ($\Delta w2$) of the pattern and the minimum width limit 1305 ($\Delta w1$) are used so that a pattern such as the noise component 1304 is not sampled, and only the data for the line pattern is taken.

FIG. 33B shows the principle of the linearity evaluation, wherein reference numeral 1310 is a printed line pattern; 1312 is the smoothing curve obtained when the center line of the printed line pattern is smoothed; 1313 is a line to which the smoothed curve is approximated to a rectilinear line; 1311 is a maximum amplification which is the maximum of the difference between the approximated line and the smoothed curve. The maximum amplitude is compared with a predetermined limitation to evaluate the linearity.

Figure 36:
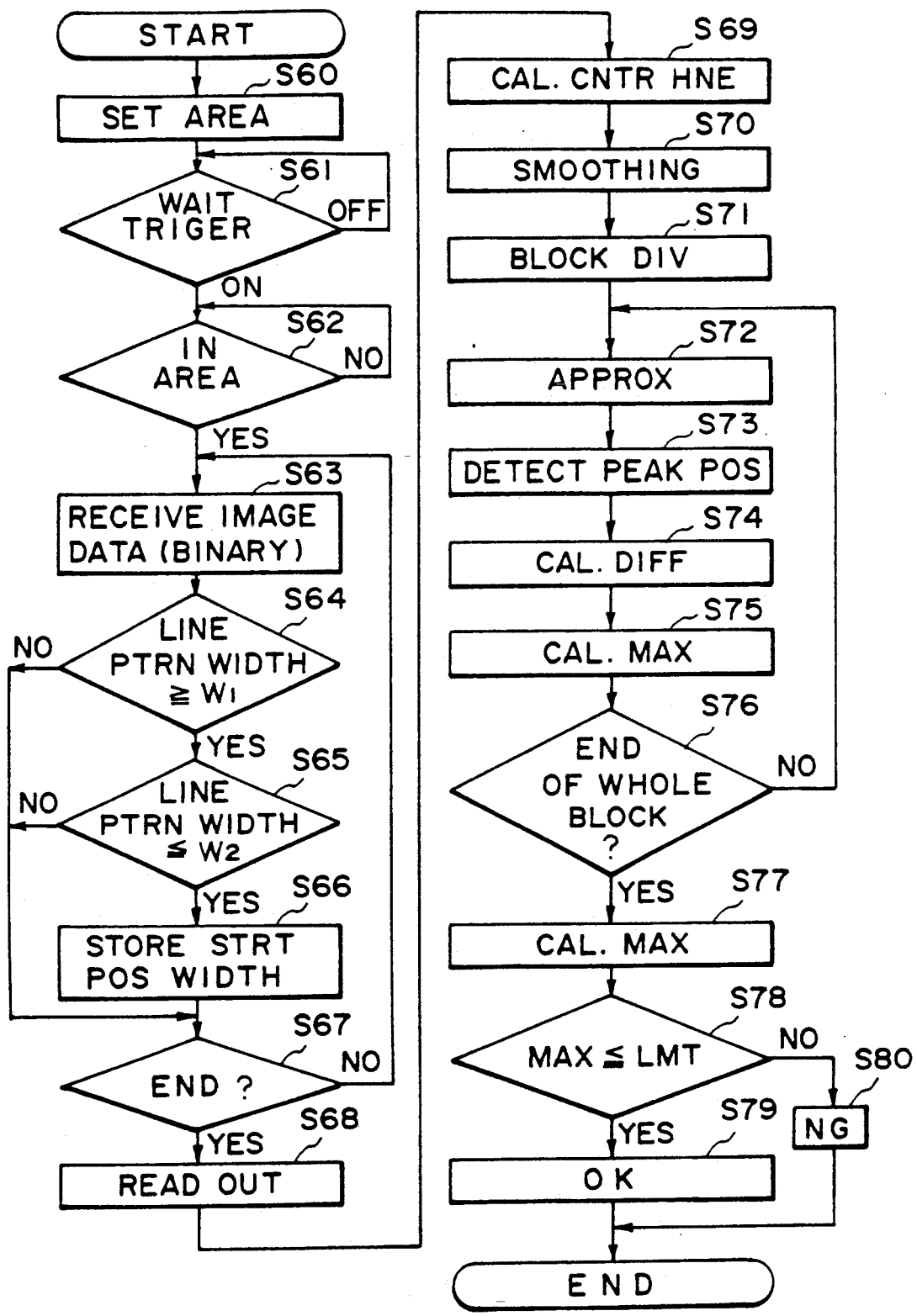
FIG. 36 is a flow chart of a linearity evaluation method.

The method of evaluation will be described in conjunction with FIG. 36. The evaluation is carried out by the MPU processor 212.

At step S60, the image input area is set in the area storing and detecting means 410 in the MPU processor 212. The setting area in this case is as indicated by the area 508 in FIG. 22(c). After the setting of the image input area is completed, the actuation of the input start trigger signal 302 which is the trigger signal for the image input is awaited at step S60. When the input start trigger signal 302 becomes on, the discrimination is made as to whether or not the X and Y coordinate positions of the image data are in the set area, at step S62. If not, the arrival of the set area is awaited. If it is in the set area, the image data inputted by the step S63 are binarized by predetermined binary levels. In the process after the step S64, the binary pattern is examined. At step S64, the appearing binary pattern is examined. At step S64, the binary pattern width is compared with the minimum limit $\Delta w1$ (1305), and if the pattern width is larger than or equal to the minimum limit $\Delta w1$, step S65 is executed. If it is smaller, it is checked whether the area has been covered, at S67. If the image data currently inputted are within the area, the operation returns to step S63. At step S65, the binary pattern width is compared with the maximum width limit $\Delta w2$ (1306), and if the pattern width is smaller than the maximum width limit $\Delta w2$, the coordinate position of the start of the pattern is written in X memory 453, and the Y coordinate position is written in Y memory 452, and the pattern width is written in the width memory 454, at step S66. If the pattern width is larger than the maximum limit width, the discrimination is made at step S67 as to whether the area has been covered or not. At step S66, the data of the pattern are stored, and then at step S67, the discrimination is made as to whether or not the input area is covered. If the image data currently inputted is still within the area, the steps S63–S66 are repeated. If the image data being inputted is outside the set area, the input of the binary data stops at this time, and the operation branches to step S68.

At step S68, the run code data stored, more particularly, the X memory 453, Y memory 452 and the width memory 454 are read out. On the basis of the read data, the center of the line pattern is calculated. By doing so, the influence of the pattern position deviation by the variation of the size of the pattern itself, can be removed. The coordinate position of the center line can be easily determined from the start point of the pattern and the width thereof. At step S70, the center line obtained at step S69 is smoothed. By further smoothing the center line as shown by broken lines in FIG. 32(b), the influence of the roughness of the edge of the pattern can be removed. At step S71, the smoothed data are divided into proper blocks. At step S72, using the smoothed data in the divided blocks, the line approximation is carried out at step S72. At step S73, the peak position is detected from the smoothed data in the divided block. Here, the peak position means the top or the bottom of the smoothed wave. As for the method for detecting the peak, the difference between the adjacent smoothed data is taken, and the inspection is made as to whether the sign (positive or negative) of the difference is positive or negative. If the sign changes from the positive to the negative or from the negative to the positive, it is taken as the peak. If the difference is zero, the center of the zero range is taken as the peak.

At step S74, the calculation is made as to how far the peak position obtained by the step S73 is away from the approximated line 1313 (FIG. 13(c)) obtained by the step S72. At step S75, the maximum (maximum amplitude 1311) of the absolute value of the value obtained by the step S74 is determined. At step S76, the discrimination is made as to whether or not the steps S72–S75 are completed for all of the blocks. If not, the operations of step S72–S75 are repeated. If so, the operation branches to S77.

At step S77, the maximum of the maximums of the absolute values of the peak position difference from the approximate line is determined and it is compared with the limit at step S78. If the maximum is smaller than or equal to the limit, step S79 is executed, and the positive evaluation is made. This is an end of the linearity evaluation. If the maximum is larger than the limit, a step S70 is carried out where the negative evaluation is made, and the linearity evaluation operation ends.

Referring to FIGS. 30(A,B), a description will be made as to the method of correcting the stage speed non-uniformity. In the evaluation apparatus of this embodiment, the sheet to be inspected is correctly positioned on the movable stage 103, and is moved under the sensor, by which the image is read. Therefore, if the stage moving speed is not uniform, the read image expands or contracts with the result that the correct reading is not possible. In order to correct the non-uniformity, in this embodiment, both of the outputs of the scan start pulses of the line sensor and the linear encoder 104 are counted by the Y position counter 313 in the A/D processor. More particularly, the output of the line sensor is supplied to the A/D processors 201–204, and the data are A/D converted. At this time for each timing (sample holding signal) of the scan start pulse 304, the count of the linear encoder 104 mounted on the stage 103 and counted by the Y position counter 313 is written in the memory in the host computer 109. As shown in FIG. 30A, the actual stage movement by one scan of the sensor is stored with the correspondence between the sensor scan number (order) and the encoder count. When the line to be evaluated in the image data is detected, the value is calculated from the memory.

As shown in FIG. 30B, in the case of the sheet feed non-uniformity (pitch non-uniformity) evaluation, as shown in FIG. 30B, the read image data are projected in the main scan direction, and the line to be evaluated is detected from the data. The position of the gravity 907 is calculated from the line. Then, the detection is made as to the sensor scan number of FIG. 30A which corresponds to the gravity position. In the case of FIG. 30B, the line gravity position 907 corresponds to scan (N+3.1), and the detection is calculated by (E+3)+-((E+4)-(E+3))×0.1 where E+3 is the encoder counter at scan (N+3), and E+3 is an encoder count at (N+4).

In this manner, the encoder counts of the line to be evaluated is counted, and the pitch is determined as the difference between the encoder counts. Thus, the sheet feed pitch non-uniformity can be evaluated without the influence of the moving speed variation of the stage.

In the foregoing embodiment, the used pattern is for evaluating the printer using plural rollers to feed the sheet. The combined pattern is not limited to this.

Figure 37:
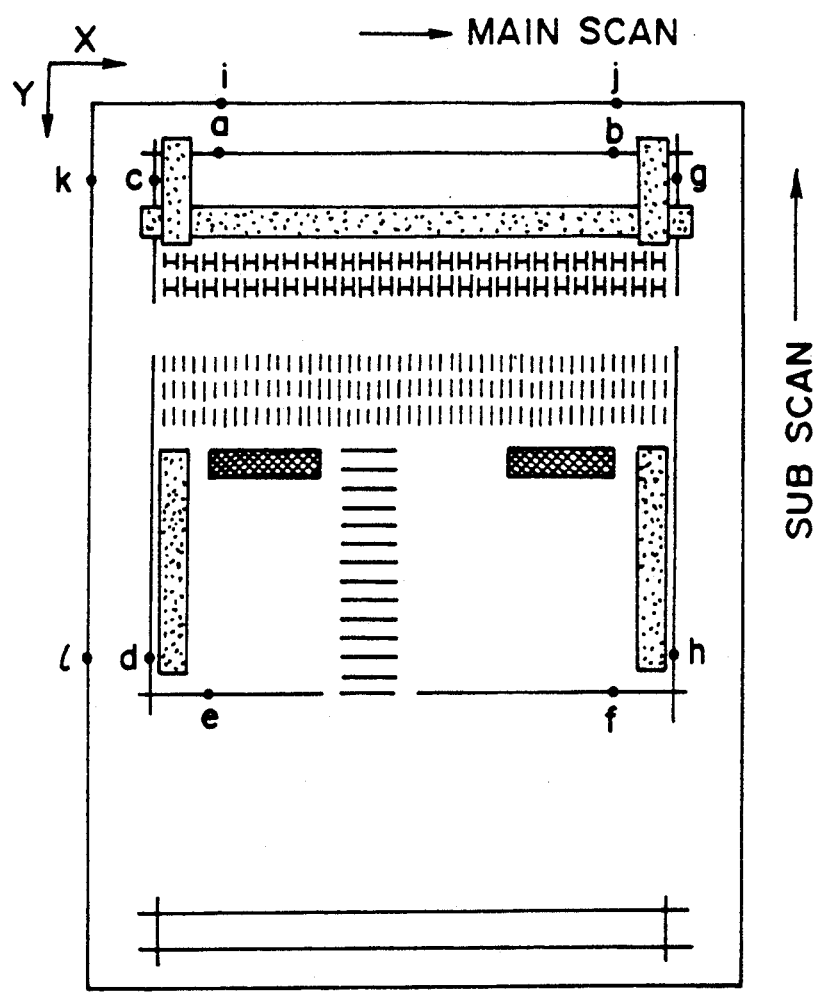
FIG. 37 shows another example of a combined pattern.

FIG. 37 shows an example of a combined pattern for evaluating the printer for sheet feed by a single driving roller and a follower roller. Similarly to the combined pattern shown in FIGS. 23(a-f), the similar evaluation items are used on the basis of the plural reading areas. As regards the sheet feed pitch non-uniformity, evaluation covering one roller rotation is enough because of the structure of the sheet feeding system. The evaluating pattern includes a horizontal line pattern of constant pitch. Therefore, it is not necessary to print the evaluating pattern over the entire length of the sheet, so that the printing time can be reduced. Similarly, the evaluating period can be reduced.

As for the measuring points, there are 12 points a-l which are located at the following positions, and the X and Y positions thereof are determined:

i, a, e: 5 column (14.83 mm from the left end)
j, b, f: 76 column (195.18 mm from the left end)
k, c, g: line 3 (13.58 mm from the top)
l, d, h: line 31 (132.1 mm from the top)
1 line=4.233 mm
1 column=2.54 mm The X and Y positions of the points are expressed as $(a_x, a_y), (b_x, b_y), \ldots, (l_x, l_y)$.

The inspection and evaluation items will be described:

1. Top registration: $a_y - i_y$, $b_y - j_y$
2. Left registration: $c_x - k_x$
3. Perpendicularity:

$$|(a_y-b_y)/(a_x-b_x)+(c_x-d_x)/(c_y-d_y)| \times 100(\%)$$

4. Inclination:

$$|((a_y-i_y)-(b_y-j_y))/(z_x-b_x)| \times 100(\%)$$

5. Parallelism:

$$|((z_y-e_y)-(b_y-f_y))/(a_x-b_x)| \times 100(\%)$$

The results of the above calculations are compared with the respective references for the purpose of evaluation, and a warning is produced if the evaluation is negative.

6. Magnification in the main scan:

$$\left. \begin{array}{l} |c_x - g_x| - 200.66 \\ |d_x - h_x| - 200.66 \end{array} \right\} \rightarrow \pm 1 \text{ mm}$$

(200.66 = 2.54 × 79 columns)

The above calculation is effected for the main scan direction, and the results are discriminated as to whether they are within −1 mm−+1 mm. If not, a warning is produced.

Sub-scan direction:

$$\left. \begin{array}{l} (|a_y - e_y| - 135.46) \times 100/135.46 \\ (|b_y - f_y| - 135.46) \times 100/135.46 \end{array} \right\} \rightarrow +0.3 - -1.7\%$$

(135.46 = 4.233 × 32 lines)

The above calculations are carried out in the sub-scan direction, and if the results are not within the range of −1.7%−+0.3%, a warning is produced.

7. Carriage pitch uniformity:

A density histogram value is calculated from one dot vertical line on line 10 in the sub-scan direction, and the central pitch is determined. The central pitch is compared with a tolerance, and if it is out of the tolerable level, a warning is produced.

8. One direction non-uniformity:

A density histogram value is calculated for 1 dot vertical line on lines 10 and 11 in the subscan direction, and the positional deviation of the column is determined. The discrimination is made as to whether the positional deviation is within the tolerable range. If not, a warning is produced.

9. Bidirectional print non-uniformity:

A density histogram value is calculated for 1 dot vertical line on lines 11 and 12 in the subscan direction, and the positional deviation of the column is determined. The discrimination is made as to whether or not the positional deviation is within the tolerable range. If not, the warning is produced.

10. Sheet feed pitch non-uniformity:

A density histogram value is calculated for 1 dot horizontal line on lines 14-33 in the main scan direction, and the central pitch is determined. The pitch is compared with the tolerable range. If it is not within the range, the warning is produced.

As described, according to the present invention, a print pattern is read, and the read image data are processed in the plural operations corresponding to plural evaluation items, contemporaneously. Therefore, in the case of the print evaluation during the printer manufacturing step, the evaluation is possible with precision and high speed.

Since plural patterns are printed on a single print, it is not necessary to produce prints for the respective evaluation items, and therefore, the manufacturing cost is reduced because of the reduction if the evaluating print outputs and the reduction of the inspecting time period.

When the pattern is read while relative motion is imparted therebetween, the data of the relative motion distance are stored in association with the reading timing, and the print evaluation is made in accordance with the movement data and the image signals, and therefore, the influence of the non-uniform movement can be removed.

Plural different patterns are read by the different reading means having different resolutions, and the different print evaluations are carried out on the basis of the read image signals, and therefore, even if the plural evaluations are carried out with different accuracies, the high speed and accurate evaluations are possible.

First information relating to an end positions of a line pattern and second information relating to a width of the line pattern are calculated from the read image signals, and the linearity is evaluated from the first information and the second information, and therefore, an accurate and high speed print evaluation is possible with a small quantity of data.

An end position and a pattern position of the print are determined from the read image signals, and the print position accuracy is evaluated on the basis of the relative positional relations, and therefore, a highly accurate and high speed evaluation for the print position is possible even if the pattern is printed on the entire surface of an A4 sheet as in the case of the print evaluation in the printer manufacturing process.

A line pattern having plural lines at a constant pitch in the direction of the relative movement between the printing head and the sheet, is read, and the projection data in the direction of the length of the line pattern are determined. From the projective data, the pitch and the contrast between the line portion and the background portion are determined, and the print evaluation is made on the basis of them. Therefore, the high accuracy and high speed evaluation for the sheet feeding system is possible even when the pattern is printed on the entire surface of an A4 sheet, for example, as in the case of the print evaluation during the printer manufacturing process.

Thus, the print evaluating apparatus of this embodiment can replace the in-line inspectors. Then, the variation in the evaluation results due to the individual natures can be avoided, thus improving the evaluation accuracy. Additionally, the inspecting period can be reduced, the product quality is reliable, and the cost can be reduced by the reduction of the number of steps.

While the invention has been described with reference to the structures disclosed herein, it is not confined to the details set forth and this application and is intended to cover such modifications or changes as may come within the purposes of the improvements or the scope of the following claims.

What is claimed is:

1. A print evaluating apparatus, comprising:
   reading means having a plurality of photoreceptors to read a print pattern line by line;
   relative movement means for imparting relative movement between the print pattern and said reading means in a direction different from a direction in which said photoreceptors are arranged; and
   processing means for effecting plural operations in parallel for plural evaluation items for image signals corresponding to the print pattern supplied by said reading means during the relative movement, and for effecting evaluation on data provided by the operations, wherein said print pattern has plural pattern areas corresponding to the plural evaluation items, and wherein said processing means effects the parallel operation for the respective pattern areas.

2. An apparatus according to claim 1, wherein said processing means has plural operation processors for carrying out different processing operations.

3. An apparatus according to claim 1 or 2 wherein said processing means converts the image signals supplied from said reading means to digital signals and processes the digital signals.

4. A print evaluation apparatus, comprising:
   reading means for reading a print evaluation pattern having plural pattern areas corresponding to plural evaluation items; and
   processing means for effecting print evaluations for the plural evaluation items on the basis of image signals corresponding to the plural area patterns supplied from said reading means.

5. An apparatus according to claim 4, wherein said pattern includes a combination of at least two of a printable region frame pattern, a density evaluation pattern, a local magnification evaluation pattern and a constant pitch horizontal line pattern for evaluation of sheet feed.

6. An apparatus according to claim 4, wherein said processing means effects the print evaluations in parallel.

7. An apparatus according to claim 4, 5 or 6, wherein said processing means converts the image signals supplied from said reading means to digital signals and processes the digital signals.

8. A print evaluation apparatus, comprising:
   first reading means having a plurality of photoreceptors to read a pattern on a print;
   second reading means having a plurality of photoreceptors to read the pattern;
   relative movement means for imparting relative movement between said first reading means and the print and between said second reading means and the print in a direction which is different from a direction in which said plural photoreceptors are arranged;
   first processing means for effecting first print evaluation on the basis of image signals supplied from said first reading means; and
   second processing means for effecting second print evaluation on the basis of image signals supplied from said second reading means;
   wherein said first and second reading means have different resolution powers.

9. An apparatus according to claim 8, wherein said first and second processing means effect the first and second print evaluations on the basis of the image signals from said first and second reading means during the relative movement.

10. An apparatus according to claim 8, wherein said first and second reading means cover different areas of the pattern.

11. An apparatus according to claim 8, 9 or 10, wherein said first and second processing means convert image signals from said reading means to digital signals, and process the digital signals to effect the first and second print evaluations.

12. A print evaluation apparatus, comprising:
   reading means having a plurality of photoreceptors to read a pattern line by line;

relative movement means for imparting relative movement between the print pattern and said reading means in a direction which is different from a direction in which said photoreceptors are arranged;

memory means for storing movement distance data relating to a movement distance imparted by said moving means in association with a reading timing of the operation of said reading means; and processing means for effecting print evaluation on the basis of image signals from said reading means and the movement distance data supplied during the relative movement.

13. An apparatus according to claim 12, wherein the pattern is a line pattern including lines at a constant pitch in the direction of the relative movement.

14. An apparatus according to claim 13, wherein said processing means effects print evaluation on the basis of a pitch of the lines, and wherein positional data of the line pattern for determining the pitch are corrected on the basis of second data stored in said memory means.

15. An apparatus according to claim 14, wherein said processing means converts the image signals supplied from said reading means to digital signals and processes the digital signals.

16. A print evaluation apparatus, comprising:

reading means for reading a line pattern having lines printed at a constant pitch in a direction of relative movement between printing means and a print on which the pattern is printed;

projecting means for determining projective data of image signals supplied from said reading means in a direction of length of the lines;

processing means for determining pitch data relating to a pitch of the lines on the basis of the projective data and effecting an evaluation relating to the relative movement on the basis of the pitch data.

17. An apparatus according to claim 16, wherein said projection means converts image signals from said reading means to digital signals, and processes the digital signals to provide the projective data.

18. An apparatus according to claim 17, wherein said processing means determines a peak position of the projective data, and provides the pitch data from an interval between adjacent peak positions.

19. An apparatus according to claim 18, wherein said processing means determines a variance of the intervals to effect the evaluation relating to the relative movement.

20. An apparatus according to claim 17, wherein said processing means determines a maximum and/or a minimum of the intervals, and compares the a maximum and/or a the minimum with a tolerable level to effect the evaluation relating to the relative movement.

21. A print evaluation apparatus, comprising:

reading means for reading a line pattern having lines printed at a constant pitch on a print in a direction of relative movement between printing means and the print;

projection means for providing projective data of image signals from said reading means in a direction of length of the lines; and processing means for determining constrast data relating to a contrast between the line and a background on the basis of the projective data and for effecting an evaluation on the basis of the contrast data.

22. An apparatus according to claim 21, wherein said projection means converts image signals from said reading means to digital signals, and processes the digital signals to provide the projective data.

23. An apparatus according to claim 22, wherein said processing means effects the evaluation on the basis of a difference of peak values of the projective data corresponding to an adjacent line and background.

24. An apparatus according to claim 23, wherein said processing means effects the evaluation on the basis of profile of a frequency distribution of the differences.

25. A print evaluation apparatus, comprising:

reading means having a plurality of photoreceptors for reading a pattern on a print line by line;

relative movement means for imparting relative movement between said reading means and the print in a direction which is different from a direction in which the photoreceptors are arranged; and processing means for determining end position information of the print and pattern position information of the pattern on the basis of image signals supplied from said reading means during the relative movement, for processing the end position information and the pattern position information to determine a positional relation between the end of the print and the pattern, and for evaluating a print position accuracy.

26. An apparatus according to claim 25, wherein said processing means determines plural pieces of information for plural pieces of end position information and the pattern, and processes the pieces of informations to evaluate the print position.

27. An apparatus according to claim 25 or 26, wherein said processing means converts the image signals supplied from said reading means to digital signals and processes the digital signals.

28. A print evaluation apparatus, comprising:

reading means having a plurality of photoreceptors to read a printed line pattern line by line;

relative movement means for imparting relative movement between said reading means and the line pattern in a direction different from a direction in which the plural photoreceptors are arranged;

calculating means for calculating first information relating to an end position of the line pattern and second information relating to a width of the pattern on the basis of the image signals supplied from said reading means during the relative movement; and processing means for effecting linearity evaluation of the line pattern on the basis of central position information determined from said first information and second information and on the basis of a line to which the line pattern is approximated.

29. An apparatus according to claim 28, wherein said processing means calculates a distance between the central position information and the approximated line, and the calculated result is compared with a tolerable level.

30. An apparatus according to claim 28, wherein the end position is a start position of the line pattern.

31. An apparatus according to claim 28, 29 or 30, wherein said processing means converts the image signals supplied from said reading means to digital signals and processes the digital signals.

32. A print evaluating method, comprising the steps of:

a first step of imparting relative movement between a print patten and a reading means which reads the print pattern in a direction different from a direction in which a plurality of photoreceptors of the reading means are arranged, the print pattern having plural areas corresponding to plural evaluation items;

a second step of effecting plural operations in parallel for plural evaluation items for an image signal, corresponding to the print pattern, output from said reading means during the relative movement of said first step; and a third step of effecting an evaluation with respect to the evaluation items on the basis of data provided by the operations of said second step.

33. A method according to claim 32, wherein in said second step, the plural operations are carried out by different operation processors.

34. A method according to claim 32 or 33, wherein in said second step, the image signal is A/D converted, and said operations are effected for the A/D converted data.

35. A method according to claim 32, wherein in said first step, the relative movement is effected a plurality of times, and in said second step, the operations are effected for the image data from the reading means.

36. A method according to claim 35, wherein in said first step, said reading means is reciprocated relative to the print pattern, and said operations are effected for the image data output from the reading means during both forward and backward movements of the reciprocation.

37. A method according to any one of claims 32, 33, 35, or 36, wherein the print pattern includes a printable region frame pattern, and a print position accuracy is evaluated on the basis of the image signal corresponding to the printable region frame pattern.

38. A method according to any one of claim 32, 33, 35, or 36, wherein the print pattern includes a printable region frame pattern, and a print linearity is evaluated on the basis of the image signal corresponding to the printable region frame pattern.

39. A method according to any one of claim 32, 33, 35, or 36, wherein the print pattern includes an image density evaluation pattern, and an image density is evaluated on the basis of the image signal corresponding to the image density evaluation pattern.

40. A method according to any one of claim 32, 33, 35, or 36, wherein the print pattern includes a partial magnification measuring pattern, and a partial magnification is evaluated on the basis of the image signal corresponding to the partial magnification measuring pattern.

41. A method according to any one of claim 32, 33, 35, or 36, wherein the print pattern includes a sheet feed evaluation pattern, and uniformity of sheet feed is evaluated on the basis of the image signal corresponding to the sheet feed evaluation pattern.

42. A print evaluating method, comprising the steps of:
a first step of reading, using reading means, a print pattern on a print including plural measurement regions corresponding to plural evaluation items; and
a second step of effecting evaluations with respect to the plural evaluation items on the basis of an image signal corresponding to the plural measurement regions produced by the reading means.

43. A method according to claim 42, wherein in said second step, said evaluations are effected in parallel.

44. A method according to claim 42, wherein in said second step, the image signal is A/D converted, and said evaluations are effected for the A/D converted data.

45. A method according to claim 42, wherein the evaluations are effected by different operation processors.

46. A method according to claim 42, wherein said print pattern includes a measurement region for evaluation of a print linearity.

47. A method according to claim 42, wherein said print pattern includes a measurement region for evaluation of a print density.

48. A method according to claim 42, wherein said print pattern includes a measurement region for evaluation of a partial magnification.

49. A method according to claim 42, wherein said print pattern includes a measurement region for evaluation of sheet feed.

50. A print evaluating method, comprising the steps of:
a first step of reading a print pattern on a print using first reading means with a first measurement resolution power;
a second step of reading the print pattern using second reading means with a second measurement resolution power which is different from the first measurement resolution power;
a third step of effecting a first print evaluation on the basis of an image signal corresponding to the print pattern read in said first step; and
a fourth step of effecting a second print evaluation, which is different from the first evaluation, on the basis of an image signal corresponding to the print pattern read in said second step.

51. A method according to claim 50, wherein the first reading means and the second reading means are moved relative to the print pattern, in said first and second steps.

52. A method according to claim 51, wherein said first and second print evaluations are effected on the basis of the image signal from said first and second reading means during the relative movement.

53. A method according to claim 50, wherein regions in the print pattern read by the first and second reading means are different.

54. A method according to claim 50, wherein in said third and fourth steps, the image signal is A/D converted, and operations are effected for digital signals provided by the A/D conversion to effect the first and second evaluations.

55. A print evaluating method, comprising the steps of:
a first step of imparting relative movement between a print pattern and a reading means in a direction different from a direction in which a plurality of photoreceptors of the reading means are arranged;
a second step of storing data of a distance of the movement in said first step in association with a read timing of said reading means;
a third step of effecting a print evaluation on the basis of (i) an image signal from said reading means during the relative movement and (ii) the stored data.

56. A method according to claim 55, wherein the print pattern comprises lines printed at regular intervals in a direction of the relative movement.

57. A method according to claim 56, wherein in said third step, the evaluation is effected by obtaining intervals between the lines on the basis of positions thereof.

58. A method according to claim 57, wherein the positions of the lines are corrected on the basis of the stored data.

59. A method according to claim 57, wherein the image signal is A/D converted, and a predetermined operation is effected for digital signals provided by the A/D conversion to determine the intervals.

60. A print evaluating method, comprising the steps of:
a first step of reading a pattern comprising lines on a print, the lines being printed at predetermined intervals in a direction of relative movement between the print and a reading means;
a second step of obtaining projective data in a direction of a length of the line pattern on the basis of an image signal corresponding to the line pattern read in said first step;
a third step of obtaining interval data relating to the intervals of the line pattern on the basis of the projective data obtained in said second step;
a fourth step of effecting an evaluation of the relative movement on the basis of the interval data obtained in said third step.

61. A method according to claim 60, wherein the image signal is A/D converted, and a predetermined operation is effected for digital signals provided by the A/D conversion to obtain the projective data.

62. A method according to claim 61, wherein in said third step, peak positions of the projective data are determined, and the interval data are obtained from intervals between adjacent peak positions.

63. A method according to claim 62, wherein in said fourth step, the evaluation is effected on the basis of a variance of the peak position data in accordance with the interval data.

64. A method according to claim 61, wherein in said fourth step, a maximum and/or a minimum of the intervals between the peak positions are determined in accordance with the interval data, and the evaluation is effected on the basis of the maximum and/or minimum compared with a reference.

65. A print evaluating method, comprising the steps of:
a first step of reading a pattern comprising lines on a print, the lines being printed at predetermined intervals in a direction of relative movement between the print and a reading means;
a second step of obtaining projective data in a direction of a length of the line pattern on the basis of an image signal corresponding to the line pattern read in said first step;
a third step of obtaining contrast data relating to a contrast of the lines and a background thereof on the basis of the projective data obtained in said second step;
a fourth step of effecting an evaluation of the printing on the basis of the contrast data obtained in said third step.

66. A method according to claim 65, wherein the image signal is A/D converted, and a predetermined operation is effected for digital signals provided by the A/D conversion to obtain the projective data.

67. A method according to claim 66, wherein the contrast data represent differences of peaks of the projective data of adjacent lines and background.

68. A method according to claim 67, wherein in said fourth step 4, the evaluation is effected in accordance with a configuration of a frequency distribution of the differences.

69. A print evaluating method, comprising the steps of:
a first step of imparting relative movement between a print and a reading means in a direction different from a direction in which a plurality of photoreceptors of the reading means are arranged, the print having a predetermined print pattern;
a second step of obtaining end position information of the print and pattern position information on the basis of an image signal from said reading means during the relative movement of said first step; and
a third step of effecting an evaluation of print position accuracy on the basis of the end position information of the print and the pattern position information.

70. A method according to claim 69, wherein in said second step, plural pieces of the end position information and plural pieces of the pattern position information are obtained, and in said third step, a predetermined operation is effected for the plural pieces of the end position information and the plural pieces of the pattern position information to evaluate the print position accuracy.

71. A method according to claim 69, wherein the image signal is A/D converted, and the end position information and pattern position information are obtained on the basis of digital signals provided by the A/D conversion.

72. A print evaluating method, comprising the steps of:
a first step of reading a line pattern on a print by a reading means having plural photoreceptors;
a second step of obtaining first information on an end position of the line pattern and second information on a width of a line pattern on the basis of an image signal output from said reading means;
a third step of obtaining information on a center position of the line pattern and an approximated line on the basis of the first information and the second information; and
a fourth step of evaluating a linearity of the line pattern from the center position information and the approximated line obtained in said third step.

73. A method according to claim 72, wherein in said fourth step, a distance between the center position information and the approximated line is calculated, and a result of the calculation is compared with a reference, by which the linearity is evaluated.

74. A method according to claim 72, wherein the end position is a start position of the line pattern.

75. A method according to claim 72, wherein in said first step, the line pattern is read while imparting relative movement between the reading means and the print in a direction different from a direction in which the photoreceptors are arranged.

76. A method according to claim 72, wherein the image signal is A/D converted, and the first information and the second information are obtained in accordance with a digital signal provided by the A/D conversion.

* * * * *

UNITED STATES PATENT AND TRADEMARK OFFICE
CERTIFICATE OF CORRECTION

PATENT NO. : 5,327,252
DATED : July 5, 1994
INVENTOR(S) : SHINSUKE TSURUOKA, ET AL.

Page 1 of 3

It is certified that error appears in the above-identified patent and that said Letters Patent is hereby corrected as shown below:

On the title page, item [56]: Reference Cited:

FOREIGN PATENT DOCUMENTS, "2586497  9/1987  France" should read --2586497  2/1987 France--; and "1069159  3/1989  Japan" should read --1-69159  3/1989 Japan--.

COLUMN 1

Line 21, "be" should read --is--; and "is" should read --be--; and

Line 28, "several of" should read --several tens of--.

COLUMN 2

Line 61, "on" should read --an--; and

Line 62, "an details of MPU" should read --details of an MPU--.

COLUMN 8

Line 55, "with" should read --of--; and

Line 56, "of" should read --with--; and "a width" should read --a sensing width--.

COLUMN 13

Line 46, "the pitch uniformity, jitter, the" should be deleted; and

UNITED STATES PATENT AND TRADEMARK OFFICE
CERTIFICATE OF CORRECTION

PATENT NO. : 5,327,252

DATED : July 5, 1994

INVENTOR(S) : SHINSUKE TSURUOKA, ET AL.

It is certified that error appears in the above-identified patent and that said Letters Patent is hereby corrected as shown below:

COLUMN 13, Cont'd.

Line 47, "entire magnification," should be deleted.

COLUMN 15

Line 58, "In" should read --It--.

COLUMN 17

Line 37, the entire line should be deleted; and

Line 38, "MPU" should be deleted.

COLUMN 23

Line 34, "Similarly" should read --Similar--.

COLUMN 26

Line 8, "2" should read --2,--.

COLUMN 27

Line 53, "a" should be deleted; and

Line 54, "a" (first occurrence) should be deleted.

COLUMN 28

Line 31, "informations" should read --information--.

UNITED STATES PATENT AND TRADEMARK OFFICE
CERTIFICATE OF CORRECTION

PATENT NO. : 5,327,252
DATED : July 5, 1994
INVENTOR(S) : SHINSUKE TSURUOKA, ET AL.

It is certified that error appears in the above-identified patent and that said Letters Patent is hereby corrected as shown below:

COLUMN 29

Line 2, "patten" should read --pattern--;

Line 37, "claim 32, 33," should read --claims 32, 33,--;

Line 42, "claim 32, 33," should read --claims 32, 33,--;

Line 48, "claim 32, 33," should read --claims 32, 33,--;

Line 54, "claim 32, 33," should read --claims 32, 33,--.

COLUMN 32

Line 5, "fourth step 4," should read --fourth step,--.

Signed and Sealed this

Eighteenth Day of April, 1995

Attest:

BRUCE LEHMAN

*Attesting Officer*

*Commissioner of Patents and Trademarks*